(12) United States Patent
Moudgill et al.

(10) Patent No.: US 10,824,586 B2
(45) Date of Patent: Nov. 3, 2020

(54) VECTOR PROCESSOR CONFIGURED TO OPERATE ON VARIABLE LENGTH VECTORS USING ONE OR MORE COMPLEX ARITHMETIC INSTRUCTIONS

(71) Applicant: Optimum Semiconductor Technologies, Inc., Tarrytown, NY (US)

(72) Inventors: Mayan Moudgill, Chappaqua, NY (US); Gary J. Nacer, Morris Plains, NJ (US); C. John Glossner, Nashua, NH (US); Arthur Joseph Hoane, Yonkers, NY (US); Sitij Agrawal, Irvington, NJ (US)

(73) Assignee: Optimum Semiconductor Technologies Inc., Tarrytown, NY (US)

( * ) Notice: Subject to any disclaimer, the term of this patent is extended or adjusted under 35 U.S.C. 154(b) by 54 days.

(21) Appl. No.: 14/724,061

(22) Filed: May 28, 2015

(65) Prior Publication Data
US 2016/0224340 A1 Aug. 4, 2016

Related U.S. Application Data

(60) Provisional application No. 62/110,840, filed on Feb. 2, 2015.

(51) Int. Cl.
*G06F 15/80* (2006.01)
*G06F 9/30* (2018.01)
(Continued)

(52) U.S. Cl.
CPC ........ *G06F 15/8053* (2013.01); *G06F 9/3001* (2013.01); *G06F 9/30021* (2013.01);
(Continued)

(58) Field of Classification Search
CPC ............ G06F 9/30036; G06F 9/30109; G06F 9/30112; G06F 15/8076; G06F 15/8053; G06F 15/8084
See application file for complete search history.

(56) References Cited

U.S. PATENT DOCUMENTS 4,172,287 A 10/1979 Kawabe et al.
4,745,547 A 5/1988 Buchholz et al.
(Continued)

FOREIGN PATENT DOCUMENTS

CN 101187861 A 5/2008
CN 101776988 A 7/2010
(Continued)

OTHER PUBLICATIONS

CRAY-1 Computer System Hardware Reference Manual 2240004, Rev. C, Nov. 4, 1977, 204 pages.
(Continued)

*Primary Examiner* — Benjamin P Geib
(74) *Attorney, Agent, or Firm* — Zhong Law, LLC

(57) ABSTRACT

A computer processor is disclosed. The computer processor may comprise a vector unit comprising a vector register file comprising at least one register to hold a varying number of elements. The computer processor may further comprise processing logic configured to operate on the varying number of elements in the vector register file using one or more complex arithmetic instructions. The computer processor may be implemented as a monolithic integrated circuit.

42 Claims, 10 Drawing Sheets

(51) Int. Cl.
  *G06F 9/38* (2018.01)
  *G06F 15/78* (2006.01)
  *G06F 9/46* (2006.01)
  *G06F 17/14* (2006.01)

(52) U.S. Cl.
  CPC ...... *G06F 9/30036* (2013.01); *G06F 9/30101* (2013.01); *G06F 9/30109* (2013.01); *G06F 9/30112* (2013.01); *G06F 9/30141* (2013.01); *G06F 9/3836* (2013.01); *G06F 9/3855* (2013.01); *G06F 15/7828* (2013.01); *G06F 15/7839* (2013.01); *G06F 15/8076* (2013.01); *G06F 17/142* (2013.01); *G06F 9/461* (2013.01); *G06F 9/462* (2013.01)

(56) References Cited

U.S. PATENT DOCUMENTS

| | | |
|---|---|---|
| 5,113,521 A | 5/1992 | McKeen et al. |
| 5,170,370 A | 12/1992 | Lee et al. |
| 5,418,973 A | 5/1995 | Ellis et al. |
| 5,513,366 A | 4/1996 | Agarwal et al. |
| 5,680,338 A | 10/1997 | Agarwal et al. |
| 5,685,005 A | 11/1997 | Garde et al. |
| 6,058,465 A | 5/2000 | Nguyen |
| 6,076,156 A | 6/2000 | Pickett et al. |
| 6,237,016 B1 | 5/2001 | Fischer et al. |
| 6,292,193 B1 | 9/2001 | Perry et al. |
| 7,062,523 B1 | 6/2006 | Hoffman et al. |
| 7,219,212 B1 | 5/2007 | Sanghavi et al. |
| 7,334,110 B1 | 2/2008 | Faanes et al. |
| 7,337,205 B2 | 2/2008 | Sazegari |
| 7,366,881 B2 | 4/2008 | Roussel et al. |
| 7,467,287 B1 | 12/2008 | Bratt et al. |
| 7,631,171 B2 | 12/2009 | Bonebakker et al. |
| 7,873,812 B1 | 1/2011 | Mimar |
| 7,966,519 B1 | 6/2011 | Aggarwal et al. |
| 8,793,299 B2 | 7/2014 | Peleg et al. |
| 9,513,917 B2 * | 12/2016 | Valentine ............... G06F 9/3001 |
| 2001/0021941 A1 | 9/2001 | Arakawa et al. |
| 2002/0087846 A1 | 7/2002 | Nickolls et al. |
| 2002/0198911 A1 | 12/2002 | Blomgren et al. |
| 2004/0064494 A1 | 4/2004 | Jahnke |
| 2004/0073773 A1 | 4/2004 | Demjaneko et al. |
| 2004/0075747 A1 | 4/2004 | Silverbrook |
| 2005/0028070 A1 | 2/2005 | Lin et al. |
| 2005/0055534 A1 | 3/2005 | Moyer |
| 2005/0097299 A1 | 5/2005 | Dockser |
| 2006/0146060 A1 | 7/2006 | Barlow et al. |
| 2007/0106718 A1 | 5/2007 | Shum et al. |
| 2007/0204135 A1 | 8/2007 | Jiang |
| 2007/0239815 A1 | 10/2007 | Cousineau et al. |
| 2008/0071851 A1 | 3/2008 | Zohar et al. |
| 2009/0112959 A1 | 4/2009 | Henry |
| 2010/0042807 A1 | 2/2010 | Gonion et al. |
| 2010/0088356 A1 | 4/2010 | Lloyd et al. |
| 2010/0115233 A1 | 5/2010 | Brewer et al. |
| 2011/0040822 A1 | 2/2011 | Eichenberger et al. |
| 2011/0145543 A1 | 6/2011 | Damron |
| 2011/0219052 A1 | 9/2011 | Langhammer |
| 2011/0320765 A1 | 12/2011 | Karkhanis et al. |
| 2012/0166508 A1 | 6/2012 | Kim et al. |
| 2012/0311305 A1 | 12/2012 | Kobayashi et al. |
| 2013/0159665 A1 | 6/2013 | Kashyap |
| 2013/0198254 A1 | 8/2013 | Peleg et al. |
| 2014/0047211 A1 | 2/2014 | Fleischer et al. |
| 2014/0149724 A1 | 5/2014 | Valentine et al. |
| 2014/0208066 A1 | 7/2014 | Bradbury et al. |
| 2014/0208078 A1 | 7/2014 | Bradbury et al. |
| 2014/0280420 A1 | 9/2014 | Khan |
| 2014/0281372 A1 | 9/2014 | Ingle et al. |
| 2014/0281402 A1 | 9/2014 | Comparan et al. |
| 2014/0289495 A1 | 9/2014 | Gonion et al. |
| 2014/0359253 A1 | 12/2014 | Gonion et al. |
| 2015/0254077 A1 | 9/2015 | Boettcher et al. |
| 2017/0039067 A1 | 2/2017 | Bradbury et al. |

FOREIGN PATENT DOCUMENTS

| | | |
|---|---|---|
| CN | 102375805 A | 3/2012 |
| CN | 102844752 A | 12/2012 |
| CN | 103119578 A | 5/2013 |
| CN | 103502935 A | 1/2014 |
| CN | 103699516 A | 4/2014 |
| CN | 104025039 A | 9/2014 |
| EP | 0044563 A1 | 1/1982 |
| EP | 0173040 B1 | 6/1991 |
| EP | 2778907 A2 | 9/2014 |
| WO | 0237264 A2 | 5/2002 |
| WO | 2013089707 A1 | 6/2013 |
| WO | 2013095637 A1 | 6/2013 |

OTHER PUBLICATIONS

NEC Supercomputer SX1/SX2 brochure, NEC Catatog No. E51133, 12 pages.
MultiTitan: Four Architecture Papers, DEC Technical report WRL 87-8, Version of Apr. 5, 1988, 133 pages.
Power ISA Reference Manual Version 2.03, IBM, Sep. 29, 2006, 850 pages.
Intel® 64 and IA-32 Architectures Software Developer's Manual, Jun. 2015, 3063 pages.
International Search Report and Written Opinion for PCT Application No. PCT/US2016/015652 dated Mar. 28, 2016, 10 pages.
ISR/WO for PCT/US2016/015146 dated May 5, 2016, 8 pages (PCT=matter 40).
ISR/WO for PCT/US2016/015376 dated Mar. 29, 2016, 9 pages (PCT=matter 43).
Stephens, "Determining whether a point is inside a polygon in C#" Jul. 28. Retreived from the Internet <URL:http://csharphelper.com/blog/2014/07/determine-whether-a-point-is-inside-a-polygon-in-c/ >.
ISR/WO for PCT/US2016/015637 dated May 5, 2016, 8 pages (PCT=matter 44).
ISR/WO for PCT/US2016/015365 dated Apr. 22, 2016, 10 pages (PCT=matter 42).
ISR/WO for PCT/US2016/014288 dated Mar. 31, 2016, 13 pages (PCT=matter 36).
P. Duhamel et al., "Fast Fourier Transforms: A Tutorial Review and a State of the Art", Elsevier Science Publishers, B.V., 1990, 41 pages.
Norman P. Jouppi, "MultiTitan Floating Point Coprocessor", Digital Equipment Corporation, Apr. 6, 1988, 23 pages.
Extended European Search Report dated Mar. 12, 2019 received in EP16747022.8, pp. 11 (matter 23).
Extended European Search Report dated Apr. 3, 2019 received in EP16747024.4, pp. 10 (matter 16).
Extended European Search Report dated Apr. 5, 2019 received in EP16747033.5, pp. 8 (matter 21).
Extended European Search Report dated Apr. 5, 2019 received in EP16747031.9, pp. 10 (matter 17).
Extended European Search Report dated Apr. 3, 2019 received in EP16746957.6, pp. 12.
Extended European Search Report dated Mar. 26, 2019 received in EP16746998.0 pp. 12.
Chinese Application No. 201680013784.9 Office Action dated Jun. 19, 2020, 33 pages.

* cited by examiner

| IF (Fetch) | DEC (Decode) | IS (Issue) | RF (Reg Fetch) | EX (Execute) | WB (Write Back) |

Figure 3

| IF (Fetch) | DEC (Decode) | RF (Reg Fetch) | IS (Issue) | EX (Execute) | WB (Write Back) |

Figure 4

| IF | DEC | Length RF | Issue | Sub-Vector RF | EX | Sub-Vector WB |

Figure 5

|  | 0 | 1 | 2 | 3 | 4 | 5 | 6 | 7 | 8 | 9 | 10 | 11 |
|---|---|---|---|---|---|---|---|---|---|---|---|---|
| vmul 0:7   | RF | EX | WB |    |    |    |    |    |    |    |    |    |
| vmul 8:15  |    | RF | EX | WB |    |    |    |    |    |    |    |    |
| vmul 16:23 |    |    | RF | EX | WB |    |    |    |    |    |    |    |
| vmul 24:31 |    |    |    | RF | EX | WB |    |    |    |    |    |    |
| vadd 0:7   |    |    |    |    |    |    | RF | EX | WB |    |    |    |
| vadd 8:15  |    |    |    |    |    |    |    | RF | EX | WB |    |    |
| vadd 16:23 |    |    |    |    |    |    |    |    | RF | EX | WB |    |
| vadd 24:31 |    |    |    |    |    |    |    |    |    | RF | EX | WB |

Figure 6

|           | 0  | 1  | 2  | 3  | 4  | 5  | 6  | 7  | 8  |
|-----------|----|----|----|----|----|----|----|----|----|
| vmul 0:7  | RF | EX | WB |    |    |    |    |    |    |
| vmul 8:15 |    | RF | EX | WB |    |    |    |    |    |
| vmul 16:23|    |    | RF | EX | WB |    |    |    |    |
| vmul 24:31|    |    |    | RF | EX | WB |    |    |    |
| vadd 0:7  |    |    |    | RF | EX | WB |    |    |    |
| vadd 8:15 |    |    |    |    | RF | EX | WB |    |    |
| vadd 16:23|    |    |    |    |    | RF | EX | WB |    |
| vadd 24:31|    |    |    |    |    |    | RF | EX | WB |

Figure 7

| Architected | | map Sv0 | map Sv1 | map Sv2 | ... | Effective | |
|---|---|---|---|---|---|---|---|
| Initial | | Sv0 | Sv1 | Sv2 | | | |
| vadd Sn0,Sv0,Sv1,Sv2 | | Sv8 | Sv1 | Sv2 | | vadd Sn0,Sv8,Sv1,Sv2 | |
| | | Sv8 | Sv1 | Sv2 | | | |
| vmul Sn0,Sv1,Sv2,Sv0 | | | Sv9 | Sv2 | | vmul Sn0,Sv9,Sv2,Sv8 | |
| | | Sv8 | Sv9 | Sv2 | | | |
| vsub Sn0,Sv0,Sv1,Sv0 | | Sv10 | | | | vsub Sn0,Sv10,Sv9,Sv8 | |
| | | Sv10 | Sv9 | Sv2 | | | |

Figure 9

| Sv0.0 | Sv0.1 | Sv0.2 | Sv0.3 | Sv1.0 | Sv1.1 |
| Sv1.2 | Sv1.3 | Sv2.0 | Sv2.1 | Sv2.2 | Sv2.3 |
| Sv3.0 | Sv3.1 | Sv3.2 | Sv3.3 | Sv4.0 | Sv4.1 |
| Sv4.2 | Sv4.3 | Sv5.0 | Sv5.1 | Sv5.2 | Sv5.3 |
| Sv6.3 | Sv6.0 | Sv6.1 | Sv6.2 | Sv6.3 | Sv7.0 |
| Sv7.1 | Sv7.2 | Sv7.3 | Sv8.0 | Sv8.1 | Sv8.2 |
| Sv11.3 | Sv9.0 | Sv9.1 | Sv9.2 | Sv9.3 | Sv10.0 |
| Sv10.1 | Sv10.2 | Sv10.3 | Sv11.0 | Sv11.1 | Sv11.2 |

Figure 10

VECTOR PROCESSOR CONFIGURED TO OPERATE ON VARIABLE LENGTH VECTORS USING ONE OR MORE COMPLEX ARITHMETIC INSTRUCTIONS

CROSS-REFERENCE TO RELATED APPLICATIONS

This application claims the benefit of U.S. provisional patent application 62/110,840, filed Feb. 2, 2015, the disclosure of which is incorporated herein by reference in its entirety.

TECHNICAL FIELD

Embodiments of the present disclosure relate to a vector processor, and in particular, to the architecture and implementation of a vector processor that includes one or more instructions that operate on variable length vectors using a plurality of types of instructions.

BACKGROUND

A vector instruction is an instruction that executes on a group of values using one instruction. For example, in the x86 architecture, the streaming SIMD extension (SSE) instruction ADDPS $xmm0,$xmm1 (add packed single-precision floating-point values), the two xmm registers each holds 4 single precision floating point values that are added together and stored in the first register. This behavior is equivalent to the pseudo-code sequence:

```
for(i = 0; i< 4; i++ )
    $xmm0[i] = $xmm0[i] + $xmm1[i]
```

The group of values can come from registers, memory, or a combination of both. Registers that hold groups of values, generally intended for use by vector instructions, are referred to as vector registers. The number of values in a group is called the vector length. In some examples, the vector length is also used to describe the number of operations performed by the vector instruction. Generally, the number of values in a vector register and the number of operations in a corresponding vector instruction calling for the vector register are the same, but they can be different in certain situations.

An instruction set architecture (ISA) including vector instructions is known as a vector ISA or vector architecture. A processor that implements a vector ISA is known as a vector processor.

A vector ISA where all vector instructions read their vector inputs from memory and write to memory without using any vector registers is known as a memory-to-memory vector or memory-vector architecture.

A vector ISA where all vector instructions, other than loads or stores, use only vector registers without accessing memory, is known as a register-vector architecture.

Vector instructions (such as the ADDPS above) can implicitly specify a fixed number of operations (four in the case of the ADDPS instructions). These are called fixed-length vector instructions. Another term for fixed-length register-vector instructions is SIMD (Single Instruction Multiple Data) instructions.

Previous generation vector processors were implemented on multiple boards using customized techniques to improve performance. The majority of them were targeted at high-performance computer applications, such as weather prediction, which often require supercomputers. However, technology development enabled single-chip microprocessors to out-perform these multi-board implementations, resulting in these vector processors being phasing out. Instead, supercomputers became multi-processors that combined multiple of these high-performance microprocessors together.

A common characteristic of these processors is that they were not generally compatible with earlier models from the same company because the instruction set varies from model to model. This practice was motivated by the fact that they were targeted at problem domains where it was critical to extract as much performance as possible, and people were willing to rewrite the application to do so. But, this practice may result in implementation details of the machine being exposed in the instruction set, and instruction sets may change as the machine implementation details change from model to model. For example, the maximum vector length that could be specified was determined by the maximum number of elements that the vector register could hold in each implementation.

The second stream of vector processors emerged as the density of transistors kept going up. By the late 1990s, general-purpose microprocessors had reached a point of diminishing returns by increasing the number of scalar functional units they could support even though there was still chip area that could be used to support more scalar function units. At the same time, there was a desire to support video encode and decode directly on these microprocessors. The confluence of these two trends led to the introduction of various fixed length vector extensions to existing general purpose architectures—MMX for the Intel x86, Altivec/VMX for the IBM PowerPC and MVI for the DEC Alpha, for instance.

These SIMD style architectures used registers with fixed byte lengths (8 Bytes in the case of MMX, 16 Bytes for Altivec). The registers were typically designed to hold multiple smaller length elements that can be operated on simultaneously. Thus, the MMX architecture could hold 4-Byte integers or 4 2-Byte integers or 8 1-Byte integers. The instructions PADDD/PADDW/PADDB would add the contents of two registers together, treating them as holding either 2 4-Byte/4 2-Byte/8 1-Byte values respectively.

As technology advances, it became possible to have the vector registers hold additional values. The MMX extension for the x86 architecture was followed by the 16-Byte SSE 32-Byte AVX2 and the 64-Byte AVX3. At each point, additional instructions were introduced to perform substantially the same operations.

In the case of implementations of general purpose architectures, for business reasons, different models are able to run the code written for older models. Thus, a newer implementation of the x86 architecture can support multiple different vector register widths, and instructions that operate on all of these instruction register widths.

SUMMARY

The above-described problems are addressed and a technical solution is achieved in the art by providing a computer processor that may comprise a vector unit comprising a vector register file comprising at least one vector register to hold a varying number of elements. The computer processor may further comprise a vector unit comprising a vector register file comprising at least one register to hold a varying number of elements. The computer processor further may further comprises processing logic configured to operate on the varying number of elements in the vector register file using one or more complex arithmetic instructions. The computer processor may be implemented as a monolithic integrated circuit.

In an example, the computer processor may further comprise a vector length register file comprising at least one register, wherein the at least one register of the vector length register file is used to specify the number of elements on which the processing logic operates. The varying number of elements may be treated as sequences of alternating real and imaginary values.

In an example, the processing logic may be further configured to read two vectors from the vector registers, treat the contents of the vector registers as vectors of complex numbers, and element-wise multiply the complex numbers from the first vector register with the second vector register to produce a resulting vector of complex numbers that is stored to the vector register file.

In an example, the processing logic may be further configured to read three vectors from the vector registers, treat the contents of the vector registers as vectors of complex numbers, element-wise multiply the complex numbers from the first vector register with the second vector register to produce a product, and add the product to the third vector to produce a third vector of complex vectors that is stored to the vector register file.

In an example, the processing logic may be further configured to read two vectors from the vector registers, treat the contents of the vector registers as vectors of complex numbers, element-wise multiply the complex numbers from the first vector register with the second vector register, and sum together the resulting products to produce a single complex number.

In an example, the computer processor may further comprise an accumulator register file configured to comprise one or more accumulator registers, wherein the single complex number is stored to the accumulator register file.

In an example, the computer processor may further comprise a floating point register file configured to comprise two or more floating point registers, wherein the single complex number is stored to two floating point registers of the two or more floating point registers.

In an example, the computer processor may further comprise a general purpose register file comprising two or more general purpose registers, wherein the single complex number is stored to two general purpose registers of the two or more general purpose registers.

In an example, the processing logic may be further configured to read two vectors from the vector registers, treat the contents of the vector registers as vectors of complex numbers, element-wise multiply the complex numbers from the first vector register with the second vector register, and sum together the resulting products with an input single complex number to produce a single complex number. The computer processor may further comprise an accumulator register file comprising one or more accumulator registers, wherein the input single complex number is read from an accumulator register of the one or more accumulator registers, and wherein the single complex number is stored to the accumulator register file. The computer processor may further comprise a floating point register file comprising two or more floating point registers, wherein the input complex number is read from two floating registers of the two or more floating point registers, and wherein the single complex number is stored to two floating point registers of the two or more floating point registers. The computer processor may further comprise a general purpose register file comprising two or more general purpose registers, wherein the single complex number is read from two general purpose registers of the two or more general purpose registers, and wherein the single complex number is stored to two general purpose registers of the two or more general purpose registers.

In an example, the processing logic may be further configured to read two vectors from the vector registers, treat the contents of the vector registers as vectors of complex numbers, element-wise multiply the complex numbers from the first vector register with the second vector register, split the resulting products into groups, and sum together the complex numbers of products of each group to produce a vector of complex numbers that is stored to the vector register file.

In an example, the processing logic may be further configured to read a vector from the vector registers, treat the contents of the vector registers as vectors of complex numbers, and sum together the complex elements to produce a single complex number.

In an example, the processing logic may be further configured to read a vector from the vector registers, treat the contents of the vector registers as vectors of complex numbers, and sum together the complex elements with a single input complex number to produce a single complex number.

In an example, the computer processor may further comprise an accumulator register file comprising one or more accumulator registers, wherein the single complex number is read from an accumulator register of the one or more accumulator registers, and wherein the single complex number is stored to the accumulator register file.

In an example, the computer processor may further comprise a floating point register file comprising two or more floating point registers, wherein the single complex number is read from two floating registers of the two or more floating point registers, and wherein the single complex number is stored to two floating point registers of the two or more floating point registers.

In an example, the computer processor may further comprise a general purpose register file comprising two or more general purpose registers, wherein the single complex number is read from two general purpose registers of the two or more general purpose registers, and wherein the single complex number is stored to two general purpose registers of the two or more general purpose registers.

In an example, the processing logic may be further configured to read a vector from the vector registers, treat the contents of the vector registers as vectors of complex numbers, divide the vector elements into groups, and sum together the complex elements in each group to produce a vector of complex numbers that is written to the vector register file.

The above-described problems are addressed and a technical solution is achieved in the art by providing a method comprising a vector register file comprising one or more registers of a computer processor that may hold a varying number of elements. Processing logic of the computer processor may operate on the varying number of elements in the vector register file using one or more complex arithmetic instructions. The computer processor may be implemented as a monolithic integrated circuit.

In an example, the computer processor may further comprise a vector length register file comprising at least one register, where the at least one register of the vector length register file may be used to specify the number of elements on which the processing logic operates. The varying number of elements may be treated as sequences of alternating real and imaginary values.

In an example, the processing logic may read two vectors from the vector registers, treat the contents of the vector registers as vectors of complex numbers, and element-wise multiply the complex numbers from the first vector register with the second vector register to produce a resulting vector of complex numbers that is stored to the vector register file.

In an example, the processing logic may read three vectors from the vector registers, treat the contents of the vector registers as vectors of complex numbers, element-wise multiply the complex numbers from the first vector register with the second vector register to produce a product, and add the product to the third vector to produce a third vector of complex vectors that is stored to the vector register file.

In an example, the processing logic may read two vectors from the vector registers, treat the contents of the vector registers as vectors of complex numbers, element-wise multiply the complex numbers from the first vector register with the second vector register, and sum together the resulting products to produce a single complex number.

In an example, the computer processor further may further comprise an accumulator register file comprising one or more accumulator registers, and the computer processor may store the single complex number to the accumulator register file.

In an example, the computer processor may further comprise a floating point register file comprising two or more floating point registers, and the computer processor may store the single complex number to two floating point registers of the two or more floating point registers.

In an example, the computer processor may further comprise a general purpose register file comprising two or more general purpose registers, and the computer processor may store the single complex number to two general purpose registers of the two or more general purpose registers.

In an example, the processing logic may read two vectors from the vector registers, treat the contents of the vector registers as vectors of complex numbers, element-wise multiply the complex numbers from the first vector register with the second vector register, and sum together the resulting products with an input single complex number to produce a single complex number.

In an example, the computer processor may further comprise an accumulator register file comprising one or more accumulator registers, and the computer processor may read the input single complex number from an accumulator register of the one or more accumulator registers, and store the single complex number to the accumulator register file.

In an example, the computer processor may further comprise a floating point register file comprising two or more floating point registers, and the computer processor may read the input complex number from two floating registers of the two or more floating point registers, and store the single complex number to two floating point registers of the two or more floating point registers.

In an example, the computer processor may further comprise a general purpose register file comprising two or more general purpose registers, and the computer processor may read the single complex number from two general purpose registers of the two or more general purpose registers, and store the single complex number to two general purpose registers of the two or more general purpose registers.

In an example, the processing logic may read two vectors from the vector registers, treating the contents of the vector registers as vectors of complex numbers, element-wise multiply the complex numbers from the first vector register with the second vector register, split the resulting products into groups, and sum together the complex numbers of products of each group to produce a vector of complex numbers that is stored to the vector register file.

In an example, the processing logic may read a vector from the vector registers, treat the contents of the vector registers as vectors of complex numbers, and sum together the complex elements to produce a single complex number.

In an example, the processing logic may read a vector from the vector registers, treating the contents of the vector registers as vectors of complex numbers, and sum together the complex elements with a single input complex number to produce a single complex number.

In an example, the computer processor may further comprise an accumulator register file comprising one or more accumulator registers, and the computer processor may read the single complex number from an accumulator register of the one or more accumulator registers, and store the single complex number to the accumulator register file.

In an example, the computer processor may further comprise a floating point register file comprising two or more floating point registers, and the computer processor may read the single complex number from two floating registers of the two or more floating point registers, and store the single complex number to two floating point registers of the two or more floating point registers.

In an example, the computer processor may further comprise a general purpose register file comprising two or more general purpose registers, and the computer processor may read the single complex number from two general purpose registers of the two or more general purpose registers, and store the single complex number to two general purpose registers of the two or more general purpose registers.

In an example, the processing logic may read a vector from the vector registers, treat the contents of the vector registers as vectors of complex numbers, divide the vector elements into groups, and sum together the complex elements in each group to produce a vector of complex numbers that is written to the vector register file.

BRIEF DESCRIPTION OF THE DRAWINGS

The present invention may be more readily understood from the detailed description of an exemplary embodiment presented below considered in conjunction with the following drawings:

FIG. 3 is an execution pipeline according to an example of the present disclosure.

FIG. 4 is another execution pipeline according to an example of the present disclosure.

FIG. 5 is a vector execution pipeline according to an example of the present disclosure.

FIG. 6 is a non-overlapping sub-vector issue according to an example of the present disclosure.

FIG. 7 is an overlapping sub-vector issue according to an example of the present disclosure.

FIG. 9 shows renaming while executing instruction sequence according to an example of the present disclosure.

FIG. 10 shows register file organization according to an example of the present disclosure.

Figure 1:
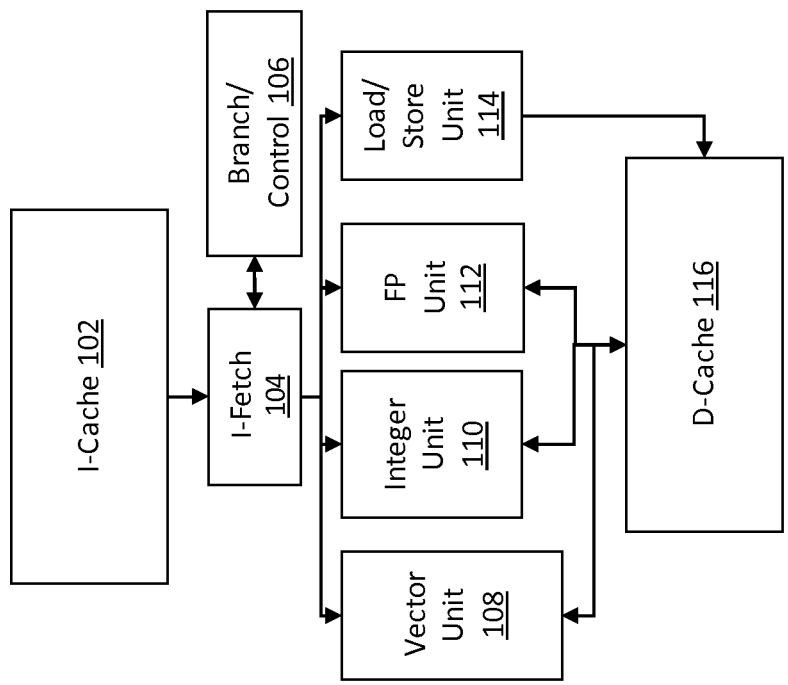
FIG. 1 is a processor according to an example of the present disclosure.

Examples of the present disclosure include an architecture that uses register-to-register variable-length vector instructions. This architecture is designed to allow for varying implementations that can execute the same instructions but at differing rates, allowing for both accommodation for future architecture designs and different price/performance trade-offs. Examples of the present disclosure include features to support both digital signal processing and graphics processing, as well as high-performance computing.

Examples of the present disclosure are designed for efficient implementations in the context of a modern out-of-order superscalar processor, relating to how register renaming and out-of-order execution are applied to the implementation of the variable-length vector register architectures.

Examples of the present disclosure include a variable-length register vector architecture suitable for implementation in the context of a modern general-purpose microprocessor. In one examples, the architecture may:
  allow an instruction to specify a vector lengths with values that are larger than those that can currently be implemented in hardware, and
  have the vector length specify the number of operations that are to be performed, independent of the number of elements that can be packed into the registers of specific implementation.

Examples of the present disclosure allow for backward compatible—namely, examples allow for an implementation that has larger registers to execute instructions with vector lengths that are optimized for a processor with shorter registers, while supporting the same set of instructions.

In some examples, the architecture supports precise exceptions for vector instructions, and causes an exception for a vector instruction that cannot be executed directly by the hardware in a specific implementation. These features make it possible to allow forward compatibility. In this case, if an instruction is optimized for vectors of length larger than supported on a particular implementation, embodiments of the present disclosure may trap the instruction and emulate the instruction in software then when the hardware attempts to execute the instruction.

The separation of vector length from the actual implementation provides flexibility with various implementations that support the execution of operations at differing rates. In general, the old-style variable length vector processors would start processing one element of the vector every cycle, while the SIMD fixed-length vector implementation typically start processing all elements simultaneously. In contrast, embodiments of the present disclosure allow for different units to process operations at different rates. For example, one or more embodiments may choose to start up to 16 ADD operations at a time, so that an addition of vector length 38 would be started over three clock cycle, with 16 ADD operations in the first two clock cycles and the remaining six ADD operations in the last clock cycle. The same embodiment may choose to only implement one divide unit, so that a divide of vector length 38 would be started over 38 clock cycles, with one divide in each cycle.

Old-style vector processors were targeted at high-performance floating-point processing, while modern SIMD style architectures are more general purpose. Embodiments of the present disclosure include instructions that are specifically targeted to digital signal processing and graphics applications in a manner that takes advantage of the variable length nature of the instructions and of the larger register sizes available.

In one embodiment, the vector architecture may be implemented as an in-order processor. In another embodiment, the vector architecture may be implemented using techniques such as out-of-order issue and register renaming to achieve better performance. This disclosure shows how a variable-length vector processor can take fit into an architecture utilizing features such as out-of-order issue and register renaming, and take advantage of these features to improve performance.

One of the inputs to a vector instruction can be a register that specifies the number of operations. For example, a vector ISA may be implemented where the vector ADD instruction is VADD $n0,$v1,$v2,$v3, with the behavior of:

```
for(i = 0; i< $n0; i++ )
    $v1[i] = $v2[i] + $v3[i]
```

There is no specific term for this style of vector instruction. A prototypical vector processor, the Cray-1, uses vector count registers to specify the length of vector instructions, and by default, Cray-1 style vector instructions are associated with a vector length register. However, in the following discussion, to explicitly distinguish from the fixed-length vector instructions, the vector instructions that get their length from a register are referred to as variable-length vector instructions.

In one embodiment, the same instruction set architecture can have different realizations. In one possible realization, it is assumed that the vector unit is one of several units in a modern out-of-order processor, as shown in FIG. 1 that illustrates a processor according to an embodiment of the present disclosure.

The processor as shown in FIG. 1 may include:
  An instruction cache 102 that holds instructions for execution;
  An instruction fetch unit 104 that fetches instructions from the instruction cache 102;
  A control/branch execution unit 106 that controls the instructions that are fetched from the instruction cache 102 based on both the instructions that are fetched and various prediction methods;
  A variety of units including integer units 110 for executing integer instructions and floating point units 112 for floating point instructions;
  A load/store unit 114 that is responsible for coordinating the movement of data from the memory to the registers associated with the various units;
  A data-cache 116 that holds data elements;
  The vector unit 108.

Figure 2:
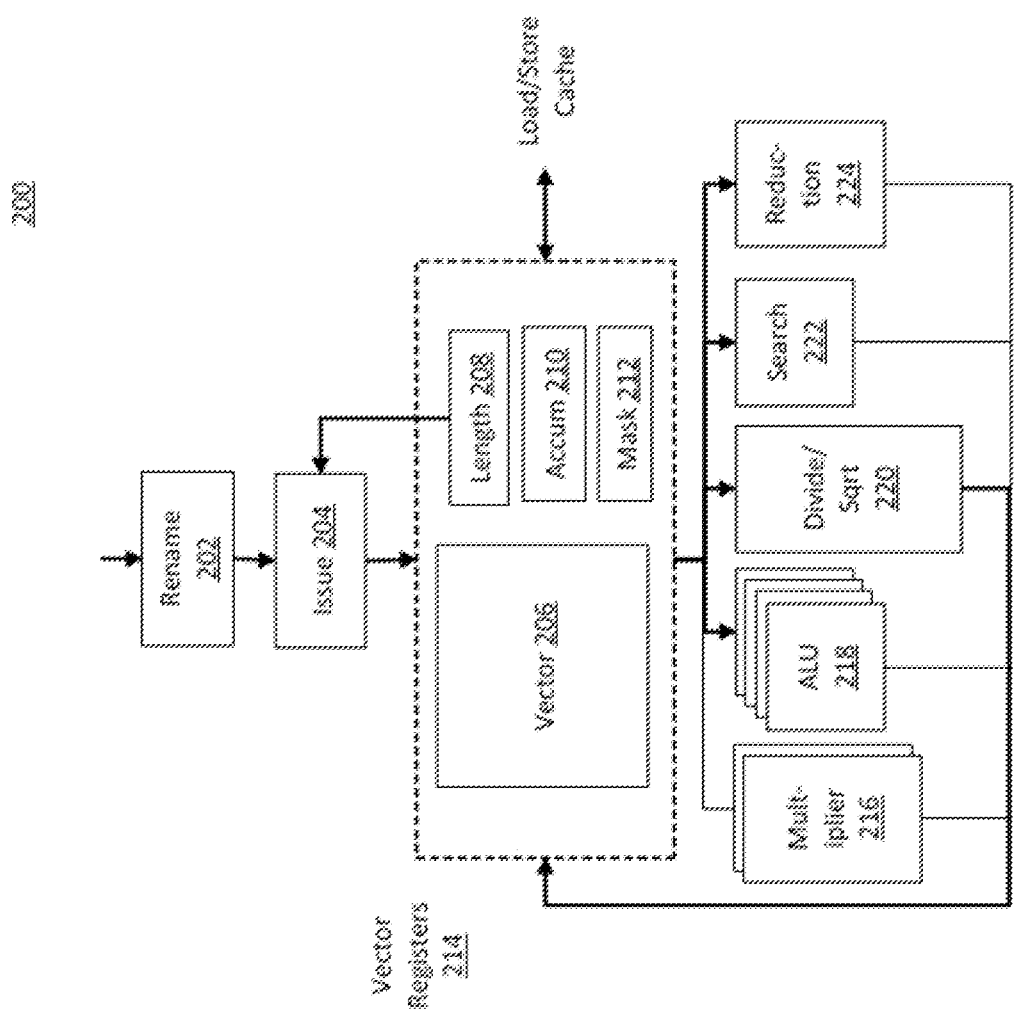
FIG. 2 is a vector unit according to an example of the present disclosure.

The vector unit 108 may include various circuit blocks, as shown in FIG. 2. FIG. 2 illustrates a vector unit 200 according to an embodiment of the present disclosure. The vector unit as shown in FIG. 2 may include:
  A register rename block 202 that renames the architected vector unit registers to physical registers;
  An out-of-order issue block 204 that holds vector instructions that are not yet complete, and is responsible for sending these instructions for execution. Note that a vector instruction may be repeatedly issued based on the vector length and the number of functional units available for that instruction;

A variety of physical vector register files 214 that include:
- A vector register file 206 that holds vectors of elements;
- A vector length register file 208 that is used to specify the number of operations performed by a vector instruction;
- A vector accumulator register file 210 that holds scalar values resulting from operations such as summing up vectors;
- A vector mask register file 212 that holds single bit values, and is used to control the execution of vector operations;

A variety of functional blocks (as shown in the figure) include:
- 2 multipliers 216;
- 4 ALUs 218;
- A single divide and/or square root 220;
- A search block 222 for searching for minimum/maximum values;
- A reduction block 224 for summing vector elements into a single value.

This combination of blocks as shown in FIG. 2 is selected for illustrative purposes, and is not exhaustive.

Unity Vector Architecture

A Unity ISA defines scalar instructions that perform the usual control, integer, floating-point and memory access instructions. It also defines a subset of instructions that manipulate vectors of instructions. In the taxonomy described in the previous section, Unity is a variable-length vector-register architecture.

This section focuses on the vector subset of the Unity ISA which is decoupled from the scalar subset. Embodiments of the present disclosure include the instructions that can be adapted to other scalar instruction sets by changing the encoding of the instructions and the number of registers.

In one embodiment, the Unity ISA registers that form the vector subset include:
- vector registers that hold collections of elements operated on by vector instructions;
- vector count registers that are used to specify the length of vector instructions, and other places where element counts are used;
- vector mask registers that hold a vector of single bits, used to control behavior of vector instructions over single elements;
- vector accumulator registers that are used when scalar values are needed as input or output for vector instructions.

In one embodiment, the vector count register of the Unity ISA includes 16-bits and is capable of specifying vector lengths of up to 65535. A vector of 65535 double precision floating numbers would require almost 512K bytes of memory per register. This size is impractical to implement in current technology. Embodiments of the present disclosure allow for a variety of implementations that implement different sizes of vector registers, suitable for the price/performance of the target application and the prevailing technology. If the vector count cannot fit in the implemented vector size, the processor may take an exception and emulate the instruction.

Instructions

One Unity vector instruction, such as one that adds two vectors, is specified as vadd $n0,$v1,$v2,$v3. This instruction adds $n0 elements from the two source vector registers $v2,$v3 and stores the results in the target vector register $v1. The semantics of this instruction are equivalent to the following pseudo-code:

```
for(i = 0; i< $n0; i++ )
    $v1[i] = $v2[i] + $v3[i]
```

Typing

In one embodiment, each element of a vector of the Unity vector ISA may be implicitly typed as one of the following types:
- byte: 1-byte integer
- short: 2-byte integer
- int: 4-byte integer
- long: 8-byte integer
- half: 16 bit IEEE floating point
- single: 32 bit IEEE floating point
- double: 64 bit IEEE floating point All instructions that operate on vector registers specify the type of elements they expect as inputs and the type of the elements that they generate as output. They include vector register loads and stores, and operations that rearrange data among vector registers without actually operating on them. They also include instructions that convert vectors of one type to vectors of other types. These instructions specify both the input and output types.

In the assembler mnemonics, and in the description of this disclosure, vector instructions that operate on floating-point elements are suffixed with an 'f'. So, vadd adds vectors of integers, and vaddf operates on vectors of floating-point elements. The size of the integer/floating-point elements is indicated by a further suffix of _b/_h/_i/_l for integers and _h/_s/_d for floating-point. Thus, vadd_b adds vectors of 1 byte integers, and vaddf_s adds vectors of single-precision floating-point values. Since the element size generally does not change the semantics of the instruction (other than modifying the size and type of the inputs and outputs), the size suffix in this disclosure is generally omitted.

If a vector register element is written as a particular type by a first instruction and is subsequently read by a second instruction that expects vector registers of some other type, the behavior of the read by the second instruction is undefined.

The Unity ISA specifies that for each implementation, there exists an implementation specific mechanism that may save and restore all vector registers.

The constraints on typing of vector elements mean that implementations of the Unity ISA are free to pick the appropriate internal representations of the various vector element types. For example, 32-bit floating point numbers can be stored in an expanded format, with a 25 bit signed mantissa, an 8 bit exponent, and bits to indicate NaN and Infinity—a total of 35 bits.

In fact, these restrictions allow for an implementation to use distinct storage for the same vector register depending on the type of vector elements. For example, every vector register could be mapped to one of two different register arrays—one for use by vector instructions that use floating-point types and one for fixed-point types. This would increase the total size of the vector file, but might increase the performance of the implementation by allowing increased overlap of integer and floating-point vector operations instructions and/or by allowing for closer coupling between registers and functional units, resulting in decreased cycle time and/or number of pipeline stage.

The requirement for the existence of an implementation-dependent way to save and/or restore all vector registers arises from the fact that during context switching, the vector registers of the executing process that is being swapped out is saved and the vector registers of the process that is going to be executed is swapped in. However, the context switch code does not know the types of elements that were last written to each register. Consequently, it is impossible to use the standard instructions without violating the constraint that they expect elements to be of an appropriate type.

There are several possible mechanisms available depending on the implementation of the vector register. If all vector elements are stored in the registers in the same format as in memory, it is a matter of using a byte move instruction, suppressing type checking (if any). If the vector elements are stored differently based on type, the implementation may keep track of the last type written to each vector register in an implementation specific (and possibly non-architected) register. The context switch code can use that information to save and then later restore the values using the store and load instructions of the appropriate type.

Unwritten Vector Elements

If a vector instruction writes N elements to a vector register, and a subsequent vector instruction reads an element from that vector register that was not written to, the behavior is undefined. In this situation, an implementation can choose to take an exception, or to return a predefined value for the unwritten elements.

In all cases, the behaviors, when executing an instruction that reads unwritten values, need to be reproducible. This means that if the same sequence of instructions is repeatedly executed, it returns the same results. This is true even if there is an intervening interrupt or context switch.

The motivation for this requirement is to make it possible to isolate faults in the code being executed on the processor. If a program executes an instruction that, because of some fault, reads a vector element that was not written to by the prior write to the vector, and the value being read is not consistent, then the results of the execution of the program can vary from run to run, making it difficult to pin down the exact cause.

Floating Point Rounding-Mode/Exceptions

IEEE floating point rounding-modes and exceptions defined for scalar operations is extended to vectors of floating point operations, by treating a vector as a series of floating-point operations, each of which needs to be compliant to IEEE floating point rounding modes and handles the five IEEE floating-point exception types appropriately.

For each of the five floating-point exception types (invalid, division by zero, overflow, underflow, inexact), there is a control bit and a status bit. The control bit is used to suppress or take interrupts when an exception is encountered, and the status bit is used to record the occurrence of an unsuppressed floating point-exception.

When a floating point vector instruction executes a sequence of floating point operations, and one of the sequence of operations encounters input operands that would cause one of the five exceptions, the control bit is examined. If the control bit indicates that this exception does not cause an interrupt to be taken, the status bit corresponding to the exception type is set to 1. Note that if multiple exception types are encountered while executing the sequence of operations, and the control bits for all these exception types are such that interrupts are not taken, multiple status bits can be set during the execution of a single vector floating point instruction.

If an exception is encountered, and the control bit is set such that the exception is to cause an interrupt, the interrupt is taken as though the instruction did not execute. Enough information is recorded so that the interrupt handler can identify the exception type and the position in the operation sequence of the operation that caused the interrupt to be taken.

For complete IEEE floating point support, the floating point vector instructions support all 4 IEEE rounding modes $-0$, $-\infty$, $+\infty$, nearest (ties to even). The rounding mode is specified by a control register, which is used to specify the floating point rounding mode to be applied. When a vector floating point instruction is executed, the results of each of the sequence of operations is rounded based on the control register arithmetic unary instructions The arithmetic vector instructions with 1 vector register input, VOP $n0,$v1,$v, executes $n0 unary operations on elements writing to $v1 from $v2. In pseudo-code:

```
for(i = 0; i< $n0; i++ )
    $v1[i] = OP $v2[i]
```

The basic integer unary instructions are:
vabs: compute the absolute value of each element
vneg: negate each element
The basic floating-point arithmetic unary instructions include:
vabsf: compute the absolute value of each element
vnegf: negate each element
vrecf: compute the reciprocal of each element
vrecef: compute an initial estimate of the reciprocal of each element that can be refined to an exact result by software
vsqrtf: compute the square root of each element
vsqrtef: compute an initial estimate of the square root of each element that can be refined to an exact result by software Note that the vabs/vabsf and vneg/vnegf instructions are equivalent to the binary vdiff/vdiffs and vsub/vsubf binary instructions (described below) with the first input containing all zero elements.

Arithmetic Binary Instructions

The arithmetic vector instructions with 2 vector register inputs, VOP $n0,$v1,$v2,$v3, executes $n0 binary operations, taking one input from $v2 and the other from $v3 and writing to $v1. In pseudo-code:

```
for(i = 0; i< $n0; i++ )
    $v1[i] = $v2[i] OP $v3[i]
```

The basic floating-point arithmetic binary instructions include:
vaddf: add elements
vsubf: subtract elements
vdifff: find the absolute difference of the elements
vmulf: multiply the elements
vminf: minimum of two elements
vmaxf: maximum of two elements
vdivf: floating-point divide
The basic integer arithmetic binary instructions include:
vadd: add elements
vsub: subtract elements
vdiff: absolute difference of the elements
vmul: multiply elements, keeping lower part of result
vmin: minimum of the two elements, treated as signed integers
vminu: minimum of the two elements, treated as unsigned integers vmax: maximum of the two elements, treated as signed integers vmaxu: maximum of the two elements, treated as unsigned integers vand: logical and of the bits of the elements vor: logical or of the bits of the elements vnand: logical nand of the bits of the elements vxor: logical xor of the bits of the elements vshl: left shift the value of the first element by the relevant 3/4/5/6 lower bits of the second element, depending on whether it is a byte/short/int/long integer type.

vshr: right shift the value of the first element by the relevant lower bits of the second element, shifting in 0s (logical right shift)

vshra: right shift the value of the first element by the relevant lower bits of the second element, shifting in the sign bit (arithmetic right shift)

In one embodiment, the Unity ISA provides for the byte variants of the shift instructions. In these instructions, the first argument is one of the integer types, while the second argument is a vector of byte elements. These instructions include vshbl, vshbr and vshbra, corresponding to vshl, vshr, vshra.

The result of an integer multiply of N bytes may, in general, require 2N bytes to represent. Recognizing this, embodiments include several different flavors of vector multiply. The basic instruction, vmul, multiplies two N byte elements together and stores the lower N bytes of the result. In one embodiment, the Unity ISA may include vector instructions that promote the multiply results to the next larger integer type and store the whole result. The vector instructions may include:

v2mul: multiply the two elements, treating both arguments assigned integers v2mulus: multiply the two elements, treating the first argument as a signed integer and the second as an unsigned integer v2muluu: multiply the two elements, treating both arguments as unsigned integers.

In some implementations, these vector instructions as discussed above are not defined for the long integer type.

Being able to process vectors of M N-byte elements and produce a single vector of M 2N-byte elements is something that fixed-vector architectures cannot do. Since the size of the vector registers is fixed, if they read M*N bytes and produce 2*M*N bytes, they need to either:

use two separate instructions to process the vector, each of which reads M/2 inputs, or use an instruction that writes two separate vector registers, each with M/2 outputs.

Multiply and Add

The multiply-and-add vector instructions may include three-input instructions, such as, the instruction of VOP $n0,$v1,$v2,$v3,$v4 that executes $n0 multiply-and-add operations, multiplying the inputs from $v2 and $v3 and combining it with $v4, then writing to $v1. In pseudo-code, the VOP instruction stands for:

```
for(i = 0; i< $n0; i++ )
    $v1[i] = ±( $v2[i] * $v3[i] ) ± $v4[i]
```

There are four floating point variants for the multiply-and-add instruction, corresponding to the ways the result of the multiply can be combined with the third argument.

vmuladdf: add result of multiply to third argument vmulsubf: add result of multiply to negative of third argument vnmuladdf: add negative of result of multiply to third argument vnmulsubf: add negative of result of multiply to negative of third argument There are two classes of integer multiply-and-add, based on whether the type of the result is the same as that of the inputs, or whether it is of twice the size.

In the four instructions of the first class, all three inputs are of the same length. The lower N bytes of the multiply are combined with the third argument, and the N bytes of the result are saved. The first class of instructions includes:

vmuladd: add result of multiply to third argument vmulsub: add result of multiply to negative of third argument vnmuladd: add negative of result of multiply to third argument vnmulsub: add negative of result of multiply to negative of third argument In the second class, the 2 inputs to the multiply are of size N, and the 3rd input are of size 2N. The first two arguments are multiplied together as signed integers, and the resulting 2N byte value is added to the 2N byte 3rd argument, with 2N byte result being stored. The second class of instructions includes:

v2muladd: add result of multiply to third argument v2mulsub: add result of multiply to negative of third argument v2nmuladd: add negative of result of multiply to third argument v2nmulsub: add negative of result of multiply to negative of third argument Reduction Reduction operations combine vector registers into scalar results that are stored in a reduction register. Optionally, a reduction register can also be added to the result.

The first class of reduction instructions includes the vector sum reduce instructions. The floating point vector sum reduce instruction, vsumred0f $n0,$c1,$v2, adds together $n0 elements of $v2 and stores them to the accumulator register $c1. The variant form, vsumredf $n0,$c1,$v2,$c3, also adds $c3 to the result. In pseudo-code:

```
sum = $c3 // or 0
for(i = 0; i< $n0; i++ )
    sum += $v2[i]
$c1 = sum
```

The floating point sum is computed at the same precision as the input types.

By contrast, the integer forms of the instructions, vsumred and vsumred0, sum up the results as 64 bit numbers independent of the type of the elements of vector $v2.

The second class of reduction instructions includes vector multiply sum instructions. The floating point multiply reduce instructions are vmulred0f $n0,$c1,$v2,$v3 and vmulred0f $n0,$c1,$v2,$v3,$c4. The behavior of these instructions is similar to that of the sum reduce, except that the elements of the two vector registers are multiplied together prior to being summed. In pseudo-code:

```
sum = $c4 // or 0
for(i = 0; i< $n0; i++ )
    sum += $v2[i] * $v3[i]
$c1 = sum
```

As in the case of the vector sum reduce, the floating point sum is computed in the same precision as the vector elements.

In the case of the integer form of the multiply reduce, vmulred and vmulred0, the elements of the two vectors are multiplied together as signed integers, and the double width products are summed together in 64 bits.

Partial Reduction

In one embodiment, instructions of the Unity ISA can perform partial reductions. These instructions may combine subsets of vectors, or of results of computations, into vectors with fewer elements.

The basic floating-point combining instruction is vsumnf_xN $n0,$v1,$v2, where N is a whole number. This instruction sums up groups of N elements of $v2, and puts the $n0/N results in $v2. The pseudo-code for this instruction is:

```
for(i = 0; i< $n0; i += N )
    sum = 0
    for( j = 0; j < N; j++ )
        sum += $v2[i+j]
    $v1[i/N] = sum
```

In one embodiment, there is an integer equivalent (vsumn) and an equivalent that sums up integer valued elements using results that are twice the size as the inputs (v2sumn).

In another embodiment, the Unity ISA may include another partial reduction vector instruction that multiplies elements of two vectors and then sums up groups of products. The version that operates on floating point elements is vdotf_xN $n0,$v1,$v2,$v3, where the "dot" in the instruction is short for "dot-product," because the operation is similar to that for a dot product. The pseudo-code for this instruction is:

```
for(i = 0; i< $n0; i += N )
    sum = 0
    for( j = 0; j < N; j++ )
        sum += $v2[i+j]*$v3[i+j]
    $v3[i/N] = sum
```

The integer and double-width integer equivalents are vdot and v2dot.

Complex Instructions

In one embodiment, instructions of the Unity ISA may include those that perform complex multiplies on vector elements, where the vector are treated as sequences of alternating real and imaginary values. For example, the vector complex floating-point multiply instruction, vxmulf $n0,$v1,$v2,$v3, includes the behavior described by the following pseudo-code:

```
for(i = 0; i< $n0; i += 2 )
    re2 = $v2[i+0]
    im2 = $v2[i+1]
    re3 = $v3[i+0]
    im3 = $v3[i+1]
```

-continued

```
    $v1[i+0] = re2*re3 − im2*im3;
    $v1[i+1] = re2*im3 + re3*im2;
```

Note that $n0 specifies twice the number of complex multiplies. The reason is that when performing other operations on complex multiplies, the normal vector operations such as vector add are used. These count the real and imaginary ADDs as separate ADDs. So, to add a vector of N/2 complex values, a count of N needs to be specified. The vector complex multiply instruction uses N so that the same vector count can be used to control both kinds of operations. The behavior of a vector complex multiply instruction is undefined if the count is odd.

All forms of vector instructions that use a floating-point multiply or a signed-signed integer multiply have their complex multiply equivalent. Apart from the vector floating point multiply instructions, these include vector integer multiplies (vxmul) and vector double width integer multiplies (v2xmul), floating point multiply add (vxmuladdf, vxmulsubf, vxnmuladdf, vxnmulsubf), integer multiply add (vxmuladd, vxmulsub, vxnmuladd, vxnmulsub) and integer double width multiply add (v2xmuladd, v2xmulsub, v2xnmuladd, v2xnmulsub).

There are also vector complex sum reduction and vector complex multiply reduction instruction. These instructions target two accumulators, one for the real and one for the imaginary sum. For example, vxmulred0f $n0,$c1,$c2,$v3, $v4 complex multiplies pairs of elements of the vector registers $v3 and $v4, treating them as complex numbers, and then sums the real and imaginary values separately. The real sum is written to $c0 and the imaginary sum to $c1. The non-zero variant vxmulredf $n0,$c1,$c2,$v3,$v4 add the original contents of $c0 and $c1 to the sums prior to writing back the results. This can be expressed by the following pseudo-code:

```
resum = $c1 // or 0
imsum = $c2 // or 0
for(i = 0; i< $n0; i += 2 )
    re3 = $v3[i+0]
    im3 = $v3[i+1]
    re4 = $v4[i+0]
    im4 = $v4[i+1]
    resum = re3*re4 − im3*im4;
    imsum = re3*im4 + re4*im3;
$c1 = resum
$c2 = imsum
```

The vector complex sum instructions such as vxsumred0f $n0,$c1,$c2,$v3 sum up alternate elements of the vector register and store them in the two specified accumulators. There are both floating-point (vxsumredf, vxsumred0f, vxmulredf, vxmulred0f) and integer equivalents (vxsumred, vxsumred0, vxmulred, xvmulred0) of the reduction instructions.

The partial reduction instructions have complex equivalents as well—vxsumnf, vxsumn, v2xsumn, vxdotf, vxdot, v2xdot.

In an example, the computer processor 100 that may comprise a vector unit 108, 208 comprising a vector register file 206 comprising at least one vector register to hold a varying number of elements. The computer processor 100 further may further comprises processing logic configured to operate on the varying number of elements in the vector register file 206 using one or more complex arithmetic instructions. The computer processor 100 may be implemented as a monolithic integrated circuit.

In an example, the computer processor 100 may further comprise a vector length register file 208 comprising at least one register, wherein the at least one register of the vector length register file 208 is used to specify the number of elements on which the processing logic operates. The varying number of elements may be treated as sequences of alternating real and imaginary values.

In an example, the processing logic may be further configured to read two vectors from the vector registers, treat the contents of the vector registers as vectors of complex numbers, and element-wise multiply the complex numbers from the first vector register with the second vector register to produce a resulting vector of complex numbers that is stored to the vector register file 206.

In an example, the processing logic may be further configured to read three vectors from the vector registers, treat the contents of the vector registers as vectors of complex numbers, element-wise multiply the complex numbers from the first vector register with the second vector register to produce a product, and add the product to the third vector to produce a third vector of complex vectors that is stored to the vector register file 206.

In an example, the processing logic may be further configured to read two vectors from the vector registers, treat the contents of the vector registers as vectors of complex numbers, element-wise multiply the complex numbers from the first vector register with the second vector register, and sum together the resulting products to produce a single complex number.

In an example, the computer processor 100 may further comprise an accumulator register file 210 configured to comprise one or more accumulator registers, wherein the single complex number is stored to the accumulator register file 210.

In an example, the computer processor 100 may further comprise a floating point register file configured to comprise two or more floating point registers, wherein the single complex number is stored to two floating point registers of the two or more floating point registers.

In an example, the computer processor 100 may further comprise a general purpose register file comprising two or more general purpose registers, wherein the single complex number is stored to two general purpose registers of the two or more general purpose registers.

In an example, the processing logic may be further configured to read two vectors from the vector registers, treat the contents of the vector registers as vectors of complex numbers, element-wise multiply the complex numbers from the first vector register with the second vector register, and sum together the resulting products with an input single complex number to produce a single complex number. The computer processor 100 may further comprise an accumulator register file 210 comprising one or more accumulator registers, wherein the input single complex number is read from an accumulator register of the one or more accumulator registers, and wherein the single complex number is stored to the accumulator register file 210. The computer processor 100 may further comprise a floating point register file comprising two or more floating point registers, wherein the input complex number is read from two floating registers of the two or more floating point registers, and wherein the single complex number is stored to two floating point registers of the two or more floating point registers. The computer processor 100 may further comprise a general purpose register file comprising two or more general purpose registers, wherein the single complex number is read from two general purpose registers of the two or more general purpose registers, and wherein the single complex number is stored to two general purpose registers of the two or more general purpose registers.

In an example, the processing logic may be further configured to read two vectors from the vector registers, treat the contents of the vector registers as vectors of complex numbers, element-wise multiply the complex numbers from the first vector register with the second vector register, split the resulting products into groups, and sum together the complex numbers of products of each group to produce a vector of complex numbers that is stored to the vector register file 206.

In an example, the processing logic may be further configured to read a vector from the vector registers, treat the contents of the vector registers as vectors of complex numbers, and sum together the complex elements to produce a single complex number.

In an example, the processing logic may be further configured to read a vector from the vector registers, treat the contents of the vector registers as vectors of complex numbers, and sum together the complex elements with a single input complex number to produce a single complex number.

In an example, the computer processor 100 may further comprise an accumulator register file 210 comprising one or more accumulator registers, wherein the single complex number is read from an accumulator register of the one or more accumulator registers, and wherein the single complex number is stored to the accumulator register file 210.

In an example, the computer processor may further comprise a floating point register file comprising two or more floating point registers, wherein the single complex number is read from two floating registers of the two or more floating point registers, and wherein the single complex number is stored to two floating point registers of the two or more floating point registers.

In an example, the computer processor 100 may further comprise a general purpose register file comprising two or more general purpose registers, wherein the single complex number is read from two general purpose registers of the two or more general purpose registers, and wherein the single complex number is stored to two general purpose registers of the two or more general purpose registers.

In an example, the processing logic may be further configured to read a vector from the vector registers, treat the contents of the vector registers as vectors of complex numbers, divide the vector elements into groups, and sum together the complex elements in each group to produce a vector of complex numbers that is written to the vector register file 206.

Saturation

In one embodiment, instructions in the Unity ISA may include the fixed point saturating vector instructions. These instructions operate on integer typed elements. Each of these fixed point saturating instructions may include an equivalent non-saturating vector instruction that operates on integer typed data. In general, a fixed point saturating instruction differs from its non-saturating equivalent in the treatment of infinite-precision results that exceed the range of values representable by the type of the result element. In the case of the non-saturating operations, the result is truncated. In the case of saturating instructions, the result is saturated to the most positive/negative value representable, depending on the sign of the result.

The instructions that fit the basic pattern are:
vadds: add saturating
vsubs: subtract saturating
vdiffs: absolute difference saturating; note that this can only saturate to largest positive value
vshls: shift left saturating
vshbls: shift by byte left saturating Fixed point multiplies treat both inputs as signed. Fixed point multiplies include the additional property that the results of the multiply of two elements is further multiplied by 2. So, the result of an integer multiply and a fixed point multiply may differ by a factor of 2, even when no saturation takes place. If the result of a fixed-point multiply of size N is to be stored back into size N, the upper N bytes of the multiply are saved, unlike an integer multiply where the lower N bytes are saved.

The multiply based fixed point instructions include:
vmuls: fixed point multiply saturating
vmuladds: fixed-point multiply and add saturating
vmulsubs: fixed-point multiply and subtract saturating
vnmuladds: negate fixed-point multiply and add saturating
vnmulsubs: negate fixed-point multiply and subtract saturating
v2muls: fixed point multiply with double-width result saturating
v2muladds: fixed-point multiply with double-width result and add saturating
v2mulsubs: fixed-point multiply with double-width result and subtract saturating
v2nmuladds: negate fixed-point multiply with double-width result and add saturating
v2nmulsubs: negate fixed-point multiply with double-width result and subtract saturating In addition, the complex integer multiplies variants also include saturating fixed point variants
vxmuls: fixed point complex multiply saturating
vxmuladds: fixed-point complex multiply and add saturating
vxmulsubs: fixed-point complex multiply and subtract saturating
vxnmuladds: negate fixed-point complex multiply and add saturating
vxnmulsubs: negate fixed-point complex multiply and subtract saturating
v2xmuls: fixed point complex multiply with double-width result saturating
v2xmuladds: fixed-point complex multiply with double-width result and add saturating
v2xmulsubs: fixed-point complex multiply with double-width result and subtract saturating
v2xnmuladds: negate fixed-point complex multiply with double-width result and add saturating The integer reduction operations also have their fixed point equivalents. In this case, the results of the summation are saturated prior to being written to the accumulator registers. These instructions are:
vsumred0s: sum elements and reduce saturating
vsumreds: sum elements with accumulator and reduce saturating
vmulred0s: sum element products and reduce saturating
vmulreds: sum element products with accumulator and reduce saturating
vxsumred0s: sum alternate elements and reduce saturating
vxsumreds: sum alternate elements with accumulator and reduce saturating
vxmulred0s: sum complex element products and reduce saturating
vxmulreds: sum complex element products with accumulator and reduce saturating The partial reduction operations also include fixed point equivalents. In this case, multiplies are performed using fixed point semantics, and the result is saturated prior to being written back.
vsumns: sum groups of vector elements and saturate sums
v2sumns: sum groups of vector elements with double-width results and saturate sums
vdots: multiply elements using fixed point semantics, sum products, and saturate sums
v2dots: multiply elements using fixed point semantics, sum products with double width results, and saturate sums
vxsumns: sum groups of alternate elements and saturate sums
v2xsumns: sum groups of alternate elements with double-width results and saturate sums
vxdots: multiply elements using complex fixed point semantics, sum products, and saturate sums
v2dxots: multiply elements using complex fixed point semantics, sum products with double width results, and saturate sums Conversion The floating point elements of a vector can be converted to the next higher size by using the vunpackf $n0,$v1,$v2 instruction. Thus, vunpack_f $n0,$v1,$v2 may convert the $n0 single-precision values in $v2 into doubles, and store the results in $v1.

The floating point elements of a vector can be converted to the next smaller size by using the vpackf $n0,$v1,$v2 instruction. Thus, vunpack_f $n0,$v1,$v2 may convert the $n0 single-precision values in $v2 into half-precision values, and store the results in $v1.

Integer elements of a vector can be converted to the next higher size by using the vunpack instruction. This instruction has several variants, including:
sign extend
zero extend
place in upper half, pad right with zeroes
For example, when unpacking the byte 0xff, the three options may result in the half-words 0x00ff, 0xffff, 0xff00, respectively.

Integer elements of a vector can be converted to the next lower size by using the vpack instruction. This also has several variants, including:
use lower half
saturate lower half
use upper half
fixed point pack; this involves taking the upper half, incrementing by 1 if the highest bit of the lower half is set, saturating if necessary.
For example, when packing the half word 0xabf0, the four options produce the results of 0xf0, 0x80, 0xab, 0xac.

A vector of integer values can be converted to or from a vector of equivalent floating point values using the instructions vfcvti/vcvtif. These instructions specify the types of both the integer and the floating-point elements. Thus, vfcvti_w_s converts four byte integers to 32 bit single-precision floating point numbers, while vicvtf_d_w converts double precision floating point elements to four byte integers.

Scalar/Vector Movement

A vector can be initialized to integer valued elements using the contents of an accumulator register using the vector broadcast instruction vbrdc $n0,$v1,$c2 and to floating point elements using the floating point equivalent vbrdcf. The pseudo-code for this instruction is:

```
for( i = 0; i< $n0; i++ )
    $v1[i] = $c2
```

A single integer element can be inserted into a vector using the vector append instruction, vappendc $n0,$v1,$c2. The floating-point equivalent is vappendcf. These instructions append an element $c2 at the position $n0 of $v1, and then increment $n0. The pseudo-code for this instruction is:

```
$v1[$n0] = $c2
$n0 = $n0+1
```

The increment of $n0 allows for repeated insertions into a vector without having to explicitly change the count register.

When an integer element is being copied into a vector using the vappendc/vbrdc instructions, the integer element is truncated. The vapppendcs/vbrdcs instructions saturate the value to the specified integer element width prior to writing.

A single integer element can be moved from a vector to an accumulator using the veleminc $n0,$c1,$v2 and velemdec $n0,$c1,$v2 instructions. The veleminc instruction copies the signed integer element in $v2 at $n0 to accumulator $c1, and then increments $n0. The velemdec instruction decrements $n0, and then copies value at the decremented position from $v2 into $c1. The pseudo-code is:

```
// veleminc
$c1 = $v[$n0]
$n0++
// velemdec
$c1 = $v[$n0-1]
$n0—
```

The operations are specified this way to allow for moving successive values from the vector register to the accumulator starting at the beginning or the end.

The floating-point equivalents are velemincf and velemdecf.

Data Rearrangement

There are a variety of instructions that rearrange data, some using just one vector, others using two. The behavior of the integer and floating-point variants of these instructions is identical, except in the size of the values that are moved.

The vector interleave instructions, vilv_xN $n0,$v1,$v2,$v3 and its floating-point equivalent vilvf create a result vector $v1 of $n0 elements by alternately selecting N elements from $v2 and $v3. $n0 may be a multiple of 2*N. The behavior of these instructions is captured by the following pseudo-code:

```
for( i = 0; i< $n0; i += N )
    for( j = 0; j < N; j++ )
        $v1[2*i+j] += $v2[i+j]
    for( j = 0; j < N; j++ )
        $v1[2*i+N+j] += $v3[i+j]
```

Embodiments of the present disclosure also provide for vector instructions that perform the inverse operation including vodd_xN $n0,$v1,$v2 and veven_xN $n0,$v1,$v2, along with their floating-point equivalents voddf & vevenf. These instructions extract the odd and even groups of N elements. This can be demonstrated in the following pseudo-code:

```
// veven
for( i = 0; i< $n0; i+= N )
    for( j = 0; j < N; j++ )
        $v1[i+j] = $v2[2*i+j]
// odd
for( i = 0; i< $n0; i+= N )
    for( j = 0; j < N; j++ )
        $v1[i+j] = $v2[2*i+j+N]
```

In one embodiment, the veven and vodd instructions are used to separate alternating groups of elements of a vector, and then to put them back together using vilv.

The trailing elements of a vector can be extracted using the vtail $n0,$v1,$v2,$n3 instruction. This instruction (and its floating-point equivalent vtailf) extracts the $n0 elements starting at $n3 from vector $v2 and puts them into $v1. The following pseudo code shows the operations in detail:

```
for( i = 0; i< $n0; i++ )
    $v1[i] = $v2[i+$n3]
```

Two vectors can be concatenated using the vconcat $n0,$v1,$v2,$v3,$n4 instruction, and its floating point equivalent vconcatf. In this instruction, the first $n4 elements of $v2 are combined with corresponding elements for $v3 to form a new vector containing $n0 elements that is written to $v1. The following pseudo code shows the operations in detail:

```
for( i = 0; i< $n4; i++ )
    $v1[i] = $v2[i]
for( i = $n4, j = 0; i< $n0; i++, j++ )
    $v1[i] = $v3[j]
```

Groups of elements in a single vector can be rearranged using the vswap_xN $n0,$v1,$v2. This instruction splits the $n0 elements into groups of N elements, and then swaps these groups and writes them to $v1. The behavior of this instruction is undefined if $n0 is not a multiple of 2*N. The pseudo-code is:

```
for( i=0; i<$n0; i += 2*N )
    for( j = 0; j < N; j++ )
        v2[i+j] = v1[i+j+N]
        v2[i+j+N] = v1[i+j]
```

Mask Set

The vector mask registers can generally be considered as a vector of single bits.

The vector mask registers can be set by the result of various vector compare instructions. For example, insturction vcmps_cond $n0,$m1,$v2,$v3 compares elements of the vector, assuming that the elements are signed integers of the appropriate size, and then store a 0/1 assuming the condition is false/true. The pseudo-code for this instruction is:

```
for(i = 0; i< $n0; i++ )
    $m1[i] = ( $v2[i] cond $v3[i] ) ? 1 : 0;
```

The condition, cond, can be one of "equal," "not equal," "greater than," "less than," "greater than or equal," and "less than or equal."

A similar instruction, vcmpu, compares vectors of integer elements as unsigned values. It includes the same 6 conditions.

The floating point instruction, vcmpf, compares vectors of floating point. In addition, it accepts two more conditions: to check if either input is a NaN, and to check if neither input is a NaN.

Embodiments may also include an instruction, vclassf_class$n0,$m1,$v2 that tests the floating point class of each element of the vector $v2, and sets the corresponding in $m1 based on whether it is a member of the class(es) specified by the class field in the instruction. A floating point number can be:

Not-a-Number (NaN); this can be further divided into quiet NaNs (qNaN) or signaling NaNs (sNaN)
Infinity
Zero
Subnormal
Normal (which is all other cases)

The class instruction modifier can allow the instruction to test for combinations of classes, as well, such as Normal+Zero, Normal+Zero+Subnormal, etc.

Embodiments may include two instructions that allow the testing of the sign and class simultaneously. The vclassps-f_classchecks for class membership as above, and also checks for the sign bit. The mask bit is set to 1 only if the instruction is in the class being tested and is positive, except for the case where the class being tested is NaN. For this exception case, the condition is true only if the NaN is a signaling NaN (sNaN). The vclassnqf_class checks for negative/qNaN.

The vmop_op $n0,$m1,$m2,$m3 combines the $n0 bits of the vector mask registers $m2 and $m3 using the bitwise operation op, and stores the resulting bits back into $m1. The pseudo-code for this instruction is:

```
for(i = 0; i< $n0; i++ )
    $m1[i] = $m2[i] op $3[i]
```

Op is one of "and," "nand," "or," "nor," "xor," "xnor," "and-complement," or "not and-complement."

Mask Data

There are several flavors of masked data operations that move the contents of vector registers under the control of the mask bits.

The vector select instructions, vself $n0,$v1,$v2,$v3,$m4 and its integer counterpart vsel look at each of the $n0 bits of the mask register, select the corresponding element from $v2 or $v3 depending on the value of the bit, and store it in that position in $v1. Its pseudo-code is:

```
for(i = 0; i< $n0; i++ )
    $v1[i] = ( $m4[i] == 0) ? $v2[i] : $v3[i]
```

The vector puncture instruction vpunct_tf $n0,$v1,$v2, $m3, where tf is one of 0 or 1, steps over the $n0 integer elements of vector mask $m3 and, if it is the same as tf, appends the corresponding element of $v2 to the result vector $v0. The number of elements appended is written back to $n0. The floating-point equivalent is vpunctf. Their behavior can be described using the pseudo-code:

```
j = 0
for(i = 0; i< $n0; i++ )
    if( $m3[i] == tf )
        $v1[j] = $v2[i]
        j++
$n0 = j
```

Another instruction is the vector vmix instruction, vmix $n0,$v1,$v2,$v3,$m4. In the vmix instruction and its floating-point counterpart vmixf, the $n0 bits of $m4 are examined. Based on its value either the next unread value of $v2 or the next unused value of $v3 is picked and added to $v1. The behavior is captured by the following pseudo-code:

```
j = 0
k = 0
for(i = 0; i< $n0; i++ )
    if( $m4[i] == 0)
        $v1[i] = $v2[j]
        j++
    else
        $v1[i] = $v3[k]
        k++
```

The combination of the vpunct and vmix instructions can be used to efficiently implement loops with conditions using vectors. For example, the pseudo code fragment below shows one implementation:

```
for(i = 0; i< N; i++ )
    if( M[i] )
        X[i] = computationF( A[i] )
    else
        X[i] = computationG( A[i] )
```

In one embodiment, the vector puncture instructions are used to separate the elements of input array A into vectors for the true and false cases, and then use the vmix instructions to combine the results from the true and false cases into the output array X. This is the same as though the code-fragment is rewritten as:

```
// vpunct_1 equivalent sequence
j = 0
for(i = 0; i< N; i++ )
    if( M[i] )
        A1[j++] = A[j]
N1 = j
// vpunct_0 equivalent sequence
j = 0
for(i = 0; i< N; i++ )
    if( !M[i] )
        A0[j++] = A[j]
N0 = j
// hopefully, now these loops can be vectorized
for(i = 0; i< N1; i++ )
    X1[i] = computationF( A1[i] )
for(i = 0; i< N0; i++ )
    X0[i] = computationG( A0[i] )
// vmix equivalent sequence
j = 0
k = 0
```

```
for(i = 0; i< N; i++ )
    if( M[i] )
        X[i] = X1 [j++]
    else
        X[i] = X0[k++]
```

One case where these kinds of transformations are very useful is in implementing divergent graphics kernels.

Search

The vector search instructions vsearchmax $n0,$n1,$c2,$v3 and vsearchmin $n0,$n1,$c2,$v3 may search for the maximum or minimum valued element of the $n0 elements in $v3 within a vector and store that value in $c2 and the corresponding position of the maximum or minimum valued element in $n1. The following pseudo-code is for vsearchmax:

```
max = $v3[0]
pos = 0
for(i = 1; i< $n0; i++ )
    if( $v3[i] > max )
        max = $v3[i]
        pos = i
```

Embodiments also include unsigned and floating-point equivalents for these instructions, including, for example, vsearchmaxu, vsearchminu, vsearchmaxf, and vsearchminf.

Digital Signal Processing

The variety of instructions (such as the fixed point saturation instructions) described above are useful in DSP (digital signaling processing) applications. This section describes instructions whose primary motivation is to accelerate the performance of DSP operations.

One set of common operations in DSP are filtering and correlation, including repeated dot products of a short vector with various positions within a longer vector of elements. In case of the canonical filter, dot products are performed at successive positions, as shown in the following code fragment.

```
for(i = 0; i< N; i++)
    sum = 0;
    for( j = 0; j < TAPS; j++ )
        sum += coeff[j]*in[i+j];
    out[i] = sum;
```

The Unity ISA uses the vfilt_xN $n0,$v1,$v2,$v3,$n4 instruction (and its floating-point and saturating fixed point equivalents vfiltf & vfilts) to accelerate this. In vfilt_xN, $v3 is a vector of $n4 elements that computes $n0 dot-products with $n4 elements of $v2 starting at the beginning, and advancing in steps of size N. This behavior is described by the following pseudo-code:

```
for(i = 0; i< $n0; i++ )
    sum = 0;
    for( j=0; j < $n4; j++ )
        sum += $v3[j] * $v2[N*i+j]
    $v1[i] = sum
```

The other common DSP operation that the Unity ISA accelerates is the radix-2 FFT (Fast Fourier Transform). The radix-2 FFT includes multiple stages, with a kernel that can be expressed as in the following code fragment:

```
for(i = 0; i< 2^M; i++ )
    X[i] = A[i] + W[i]*A[i+2^M];
    X[i+2^M] = A[i] - W[i]*A[i+2^M];
```

Note that X, A, and W in this example are all complex numbers, and the multiplication is a complex-complex multiplication. W is known as the twiddle factor.

We accelerate this kernel by using the vfftf_xN $n0,$v1,$v2,$v3, or by using its integer and fixed-point saturating equivalents vfft & vffts. These instructions divide the $n0 elements of $v2 into groups of 2*N complex numbers—i.e. 4*N elements, where pairs of elements represent the real and imaginary parts. The radix-2 FFT of size log 2(N) is executed on each group using the first 2*N elements of $v3 as the twiddle factors, and the result is written to $v1. The pseudo-code for this operation is:

```
for(i = 0; i< $n0; i += 4*N )
    for( j = 0; j < 2*N; j+= 2 )
        wre,wim = $v3[j], $v3[j+1]
        are,aim = $v2[i+j+2*N], $v2[i+j+2N];
        re = wre*are - wim*aim
        im = wre*aim + wim*are
        $v1[i+j]    = $v1[i+j] + re
        $v1[i+j+1]  = $v1[i+j+1] + im
        $v1[i+j+2N] = $v[i+j] - re
        $v1[i+j+2N+1] = $v1[i+j+1] - im
```

The behavior of the instruction is undefined if $n0 is not a multiple of 4N. The multiplication in vffts is done using fixed-point semantics. In general, N may be restricted to powers of 2.

When the 2M is 1 in the example above, W[0]=1, and the multiply is unnecessary. the vfft2f $n0,$v1,$v2 instruction, and its counterparts vfft2 & vfft2s may take advantage of this fact. The pseudo-code for this instruction is:

```
for(i = 0; i< $n0; i += 4 )
    $v1[i+0] = $v2[i+0] + $v2[i+2]
    $v1[i+1] = $v2[i+1] + $v2[i+3]
    $v1[i+2] = $v2[i+0] - $v2[i+2]
    $v1[i+3] = $v2[i+1] - $v2[i+3]
```

After (or before) an FFT, the data may need to be reordered in a pattern called bit reversal. In bit reversal of length M, if we write out the index of a value as being at position bM-1bM-2 . . . b1bo, then it can get moved to position b0b1 . . . bM-2bM-1; i.e. to the index with its bits reversed, hence the name. The vswapbr_M_xN $n0,$v1,$v2 instruction and its floating point equivalent vswapbrf can be used to do this transform. They group the elements of $v2 into groups of size N, then arrange the groups into clusters of N*2M. The groups within these clusters are swapped based on bit reversal. The behavior of these instructions is undefined if $n0 is not a multiple of N*2M. The pseudo-code is:

```
for(i = 0; i< $n0; i += N*2^M )
    for( j = 0; j < 2^M; j++ )
        for( k = 0; k < N; k++ )
            $v1[i + j*N + k] = $v2[ i + bitreverse_M(j)*N + k ]
```

Graphics

Graphics code involves vector and matrix arithmetic, mostly on small 4×4 matrices and 4-vectors, and mostly using single-precision floating point. Instructions that can compute the dot-product of 4 vectors (vdot_x4) are discussed in previous sections.

The vmulmmf_xN $n0,$v1,$v2,$v3 instruction assumes that $v2 and $v3 are a collection of N×N square matrices that are multiplied together and the results are stored in $v1. $n0 may be a multiple of N2. The pseudo-code is:

```
for(i = 0; i< $n0; i += N² )
  for( j = 0; j < N; j++ )
    for( k = 0; k < N; k++ )
      sum = 0;
      for( 1 = 0; 1 < N; 1++ )
        sum += $v2[i+j*N+1] + $v3[i+1*N+k]
      $v1[i+j*N+k] = sum;
```

The vmulmvf_ord_xN $n0,$v1,$v2,$v3 instruction assumes that $v2 is a collection of N vectors and $v3 is an N×N matrix. This instruction multiplies each of the vectors with the matrix, and writes the $n0 results into $v1. $n0 may be a multiple of N. The order of the matrix, ord, can be specified to be either column major or row-major. The order of the matrix represents how the elements of the matrix are stored in the vector $v3. For row-order, the pseudo-code is:

```
for(i = 0; i< $n0; i += N )
  for( j = 0; j < N; j++ )
    sum = 0;
    for( k = 0; k < N; k++ )
      sum += $v2[i+k] + $v3[i+j*N+k]
    $v1[i+j] = sum;
```

For column order, the pseudo code may read $v3[i+j+N*k].

Another vector operation that occurs frequently is vector normalization. In vector normalization, each N-vector is scaled so that its length is 1. This is done using the vnormalf_xN $n0,$v1,$v2 instruction. This divides the $n0 elements of $v2 into groups of N and divides them. The pseudo-code is:

```
for(i = 0; i< $n0; i += N )
  sum = 0;
  for( k = 0; k < N; k++ )
    sum += $v2[i+k] * $v2[i+k]
  scale = 1/√sum
  for( k = 0; k < N; k++ )
    $v1[i+k] += $v2[i+k] * scale
```

This can be a fairly expensive operation to compute. Because exact precision is generally not needed in graphics code, some embodiments may use an instruction of vector normalization approximation, vnormalaf, which is like the vnormalf instruction except that it produces an approximation to the actual normalized value.

Another operation that is defined in the Unity ISA to support graphics is to rearrange the data in a vector to implement a matrix transpose of a square matrix. The instruction vswaptrf_xN $n0,$v1,$v2 treats the $n0 elements of $v2 as a collection of N×N square matrices. Each of these is then transposed and the result written to $v1. The pseudo-code for this is:

```
for(i = 0; i< $n0; i += N² )
  for( j = 0; j < N; j++ )
```

```
    for( k = 0; k < N; k++ )
      $v1[i+j*N+k] = v2[i+k*N+j]
```

The integer equivalents of the instructions described in this section are vmulmm, vmulmv, vnormal, vnormala, and vswaptr.

Vector Load/Store

Vectors are moved from memory to vector registers and back using vector loads and stores. There are different ways of specifying the memory address. In the Unity ISA, the base address is provided by an address register, denoted $a. When adapting the instructions described here to another architecture, the mechanism by which the base address is generated may need to be changed to fit in with the characteristics of that architecture.

The basic load/store moves a contiguous block of memory to/from a vector register. The instructions ldv $n0,$v1,$a2 and sty $n0,$v1,$a2 move the $n0 integer elements in $v1 from/to a contiguous block of memory starting at $a2. Floating point vectors are moved using the ldvf/stvf instructions. The pseudo code for the ldv operation is:

```
for(i = 0; i< $n0; i ++ )
  $v1[i] = *($a2+i*S1ZE)  // SIZE = #bytes of element
```

Strided load/stores move non-contiguous blocks of memory. Here the address for each element are computed based on the stride specified in $n3 in the instructions ldstv $n0,$v1,$a2,$n3 and ststv $n0,$v1,$a2,$n3. The pseudo-code for the ststdv instruction is:

```
for(i = 0; i< $n0; i ++ )
  *($a2+i*SIZE*$n3)= $v1[i]
```

Indexed load/stores ldixv $n0,$v1,$a2,$v3 and stixv $n0,$v1,$a2,$v3 use the elements of vector $v3 to provide offsets into the base address $a2 to provide the address for each of the $n0 elements of $v1 that are to be moved from/to memory. The pseudo-code for the ldixv instruction is:

```
for(i = 0; i< $n0; i ++ )
  $v1[i] = *($a2+$v3[i]*SIZE)
```

The vector offset elements could be of any type. According to an embodiment of the Unity ISA, the vector offset elements are assumed to be of half-word precision.

The strided and indexed loads/stores may have a floating-point equivalent, ldstvf, ststvf, ldixvf, and stixvf.

Variations

Length Register

Embodiments of the present disclosure may use an explicit length register $n0. Every vector instruction may include an explicit length field. Alternatively, selected encoding scheme may be used where the length registers are sometimes or always derived from the other information in the instruction, including, for example:
  The target register
  Either of the source registers
  The instruction opcode Alternatively, exactly one length register may be selected to have all instructions use that length register. Other count registers may be used to deal with instructions, such as vtail, where multiple counts are needed.

Another alternative is to have a notion of an active length register. In this model, there is an instruction (say vactive $n0) that makes one of the vector count registers $n0 as the implicit input to all subsequent vector instructions till the next execution of a vactive instruction. Note that this introduces more states into the processor, to keep track of the currently active count register.

Typing

In the architecture having been described, the types of the elements of vectors read by and produced by all vector instructions are specified. If the input type of the elements does not match the type expected by the vector instructions, the result is undefined.

A novel alternative model relies on keeping track of the types of the vector elements dynamically; every time a vector is written, the type of the elements is recorded. In this model, when a vector instruction is executed, the recorded type of each input is compared against the expected type. If they are not the same, the input is implicitly converted to the expected input type, using some set of rules. For example, when assuming that the instruction being executed is a vaddf_d (i.e. vector add double-precision), if one of the input is a vector of single-precision floating-point elements, these single-precision floating-point elements may be converted to doubles before being used.

In this novel model, the conversion rules can either be fixed, or can be configured dynamically probably by using a control register.

Yet another alternative model dispenses with the typing for most vector instructions. In this model, a vector instruction generally does not specify any types. Instead, when it executes, it examines the recorded types of its inputs and infers both the operation and output types. Consider in this model what happens if, for example, a vadd instruction were executed:

It reads its inputs
If both the inputs were floating-point vectors, it would perform a floating-point add operation; if they were integers, it would perform an integer add operation.
The output vectors type is set to the type of the input.

If the types of the input are not the same, based on the architecture definition, the resulting behavior can be undefined, or it can result in implicit conversions of values.

In this approach, some instructions may still need to specify the output types of the vectors, including those instructions where there is not enough information to infer an output type (such as vector loads) and those instructions that explicitly change the types of vectors.

Scalar Registers

The disclosure so far has specified the use of accumulator and count registers that are presumably specific to the vector unit. But, other scalar register types may be used in place of these registers. For example, general purpose/integer registers may be used to specify counts, and floating-point registers may be used as the target for floating point reduction operations.

Count Register Vs. Constant

In various instructions, such as the group counts _xN in vilv etc, constant values are specified as part of the instruction. Alternatively, count registers may be used. Thus, instead of vilv_xN $n0,$v1,$v2,$v3, vilv $n0,$v1,$v2,$v3, $n4 may be used. When $n4 contains the value N, vilv $n0,$v1,$v2,$v3,$n4 provides identical behavior.

Others

The instructions described may be encoded in different manners other than described above, including:

In some cases, the description may leave the range of the various fields, such as the group counts _xNinvilv, vsumn, vdot as undefined. An architecture can choose varying subsets of values.

In other cases, such as vpunct, a single register (e.g., $n0 in the case of vpunct) is chosen to be both an input and an output. An alternative encoding may use separate registers for this purpose—so instead of vpunct_tf$n0, $v1,$v2,$m3, the instruction may be vpunct_tf $n0, $n1,$v2,$v3,$m4 with $n1 being the output.

The other direction is also possible. For example, while vmuladd $n0,$v1,$v2,$v3,$v4 with $v1 the output, and $v4 as the adder input is used, vmuladd $n0,$v1,$v2, $v3 may also be used, where $v1 is both used as the adder input and used as the output target.

The disclosure has explicitly enumerated all the registers used by an instruction. For example, in vxmulred $n0,$c1,$c2,$v3,$v4, two target accumulator registers $c1 and $c2 are explicitly named. In some embodiments, register pairs could be used, where only one of the registers is named and the other is implicitly derived. In another embodiment, the targets is fixed, so that the instruction always writes to the same two accumulators.

In an instruction where vectors of different lengths and/or other counts are involved, the vector count register(s) specify some of the values, and the other counts are derived. It is possible to have encodings where different counts are explicitly specified. For example, in the vsumn_xN $n0,$v1,$v2 instruction, $n0 specifies the length of the input $v2, and the length of the output $v1 is derived to be $n0/N. Alternatively, $n0 may be used to specify the length of the output $v1, and to derive the length of the input as $n0*N.

Instruction Issue

This section concerns issues relating to implementing a variable-length long vector-register architecture, such as the Unity instruction set architecture, specifically related to instruction issue—namely, the selection of one or more instructions from instructions that are available and the dispatch of the selected instructions for execution. The issues are in the context of various implementation styles. The styles considered range from straightforward in-order, non-renaming, non-pipelined implementations to more performance-oriented out-of-order, renaming, deeply pipelined implementations.

One defining characteristic of long-vector architectures is that the number of elements in a vector, and therefore the number of operations required to be performed on that vector, exceeds the number of available functional units that can perform those operations. In each cycle, only a subset of the vector operations can start being processed. Consequently, a vector instruction may, in general, require multiple cycles to complete.

Scalar Instruction Issue

Consider the 6-stage processor execution pipeline shown in FIG. 3. Implementations of a processor pipeline can be simpler by combining various stages (e.g. decode and issue), or more complex (e.g. multiple instruction fetch and execute stages). The actual pipeline is a function of the process technology, the desired power/area/performance, and the instruction set architecture being implemented.

Consider the situation to execute two operations: mul $r0,$r1,$r2 and add $r0,$r4,$0. The first instruction:

reads the registers $r1 and $r2 from the register file in the RF (register fetch) stage multiplies these values read in the EX (execution) stage writes the results back to register $r0 in the WB (writeback) stage The second instruction reads the results of the multiplications and register $r4, adds these values, and writes the results back to $r0.

In a naive processor implementation, the ADD instruction cannot issue till the contents of the multiply have been written to the register file. This means that the ADD instruction cannot execute immediately after the multiply. Instead, the ADD instruction needs to wait for two extra cycles. Alternatively, if the register file is a write-through register file, or if it includes bypass logic, the register file of the ADD can overlap with the WB of the mul, and the add is held up for only one cycle. If the processor includes logic to bypass the results of the execution stage so that the next instruction can use it, then the ADD instruction can issue back-to-back with the mul instruction.

The instruction issue logic 204 is responsible for coordinating the issue of instructions so that they execute successfully. This includes making sure that the appropriate values are read, as shown above. It also ensures that more instructions do not try to access a hardware resource that are not supported. Some examples are:

- a processor with 1 multiplier and 1 adder. The instruction issue logic may ensure that 2 adds are not sent for execution
- a processor with a 4-stage multiplier that is not fully pipeline, and can only accept instructions every other cycle. The instruction issue logic may ensure that 2 multiplies are not sent for execution back-to-back
- a processor with 1 write port on the register-file, but multiple functional units with a varying number of execute stages. The instruction issue logic may ensure that the instructions are sent for execution in such a fashion that no two instructions complete in the same cycle.

Instruction issue can generally be divided into two classes; in-order and out-of-order. In in-order instruction issue, instructions are sent for execution in the order that they are fetched from memory. If an instruction cannot be issued, all succeeding instructions are blocked from issue till that instruction is issued. In out-of-order instruction issue, a pool of instructions is maintained. Instructions are picked from this pool and issued for execution. If an instruction cannot be issued, but a subsequent one can, then it is possible that the subsequent instruction is executed first.

Another organization of the processor pipeline is shown in FIG. 4. This pipeline organization is generally found in out-of-order processors. Instructions read their input values from the register file and enter a issue structure. The issue structure is part of the memory used to hold instructions while the issue logic is the logic circuitry used to select from the instructions stored in the issue structure for sending to execution. In one embodiment, both the issue structure and the issue logic is part of the issue block 204 as shown in FIG. 2. Note that some input values may not be available in the register file because the instructions that produce them have not finished execution, or are themselves waiting in the issue structure. The issue logic examines the pool of instructions in the issue structure and, from the ones that have all their input values available and that can be executed given the available resources, picks one or more instructions for execution. When an instruction execution completes, the execution results are written back to the register file. These results are also sent to the issue structure, where any instruction that is waiting for these results copies these results, and may now be ready for issue.

Variable-Length Long Vector Register Instructions

A vector register is a register capable of holding a number of values such as, for example, multiple single-precision floating point numbers or multiple bytes. These registers may be identified as $vN. A vector instruction is one which specifies operations on the vector registers, generally applying the same operation to the individual elements of the vectors. A variable length instruction is one where the instruction specifies the number of elements that may be processed using a register, generally known as the vector-length register and denoted as $nN. For example, the instruction vadd_f $n0,$v1,$v2,$v3 has the behavior similar to the following pseudo-code:

```
for( j = 0; j < $n0; j++ )
    $v1[j] = $v2[j] + $v3[j]
```

Long vector instructions are ones where the instructions may take multiple execution cycles. For example, if the vectors can hold up to 64 floating-point numbers and there are only 8 floating point adders, the execution of the vector instruction may take at least 8 cycles to execute a maximum length vector. However, it is possible that $n0 specifies a much smaller vector. In that case, it is possible to complete the instruction using fewer execution cycles (including 0, if $n0 is 0).

Vector Instruction Issue

It is possible to implement vector instruction issue in a fashion similar to scalar instruction issue—the input vector registers are read in their entirety along with the vector length register, and the execution unit executes over multiple cycles, operating on subsets of the inputs, producing the corresponding results, and then writing the result to the output register. In this approach, there needs for a state machine or sequencer that may identify the subset that is to be read and written by the execution units in each of the cycles. This sequencer can always run for the maximum number of cycles, ignoring the vector-length, or, preferably, can run for a number of a cycles based on the contents of the vector length register. The behavior is captured in the following pseudo-code for the execution of vadd_f $n0,$v1,$v2,$v3:

```
// RF stage
for( j = 0; j < VECTOR_LENGTH; j++ )
    in0[j] = $v2[j];
for( j = 0; j < VECTOR_LENGTH; j++ )
    in1[j] = $v3[j];
// multiple EX stages
for( j = 0; j < $n0; j += NUM_ADDERS )
    for( k = 0; k < NUM_ADDERS; k++ )
        out[j+k] = in0[j+k] + in1[j+k]
// WB stage
for( j = 0; j < VECTOR_LENGTH; j++ )
    $v1[j] = out[j];
```

This approach has the drawback that it requires that the entirety of the register file be read, intermediate input and output pipeline registers that are very wide, since they have to match the size of the register file, and have to have very wide multiplexers to select the subset of inputs the execution units can operate on.

An alternative approach is to read and write those subsets of the vector file in each cycle that is needed by the execution stage. This approach is illustrated with the following pseudo code:

```
for( j = 0; j < $n0; j += NUM_ADDERS )
    // RF stage
    for( k = 0; k < NUM_ADDERS; k++ )
        in0[k] = $v2[j+k]
    for( k = 0; k < NUM_ADDERS; k++ )
        in1[k] = $v3[j+k];
    // EX stage
    for( k = 0; k < NUM_ADDERS; k++ )
        out[k] = in0[k] + in1[k];
    // WB stage
    for( k = 0; k < NUM_ADDERS; k++ )
        $v3[k] = out[k]
```

This illustrative pseudo code omits several details, including pipeline overlap and the handling of the situation where $n0 is not a multiple of NUM_ADDERS, whose handling can be implemented in a suitable manner.

This approach may also include a sequencer. In one embodiment, the sequencer may be stand-alone. In an alternative embodiment, the sequencor may be incorporated into the instruction issue logic. When incorporated, all the details of instruction issue and sequencing are incorporated into one block.

One of the inputs used to efficiently execute a vector instruction is the contents of the vector length register. The contents of the vector length register suggest the need to read the vector length register prior to issue. However, for efficiency reasons, it is desirable to read the vector length register after issue (otherwise the contents of the vector length register need to be held in the issue structure). Thus the preferred pipeline organization for the vector unit is the one similar to that shown in FIG. 5.

Sub-Vector Instruction Issue

As mentioned above, an instruction cannot be issued until its input values are available (or would be available, via bypassing). In long vector execution, during each execution cycle, the vector instruction only operates on a subset of the vector at a time. Therefore, the execution does not depend on the entire vector being available, but only a subset. For a higher performance implementation, it is preferable that the instruction issue logic treat vector instructions at the sub-vector level.

Consider the case where the vector unit has two sets of execution units—8 multipliers and 8 adders. Assume that the instructions vmul_f $n0,$v0,$v1,$v2 and vadd_f $n0,$v3,$v4,$v0 need to be executed, and that the vector lengths are the same and the results of the vector multiply are used by the vector add. Further, assume that both types of execution units take 1 execution cycle, and that $n0 is 32. If the instruction issue logic waits for all elements of $v0 to be written before starting the vadd, as shown in FIG. 6, it can take 12 cycles to execute.

Alternatively, if instruction issue only waits for the appropriate sub-vector of $v0, it can partially overlap the execution of the vadd with the vmul as shown in FIG. 7, resulting in a total time of 9 cycles.

If the instruction-issue logic is out-of-order, then sub-vector issue can be adapted to allow sub-vectors of instructions to be issued for execution out-of-order with respect to each other. This can include the reordering of different sub-vectors belonging to a single instruction.

In one embodiment, the vector instruction may be split into sub-instructions each of which deal a with a specific sub-vector and inserts each of this sub-instructions into the issue structure, to be dealt with independently by the instruction issue logic. This may impact the rest of the pipeline, specifically including the instruction completion and retire logic.

Implementations

The implementations are based on a design target that includes the ability to overlap execution between separate vector instructions and a small degree of out-of-order. In particular, the target application does not require the extreme performance enabled by splitting instructions into sub-instructions. Instead, only one sub-vector is a candidate for execution at any one time, generally the smallest unexecuted sub-vector.

In the implementation, all registers are renamed, removing the possibility of write-write collisions in the vector register file. Further, it is assumed that the vector register file has 12 physical registers of 256 bytes which are organized into 8 sub-vectors of 32 bytes.

Figure 8:
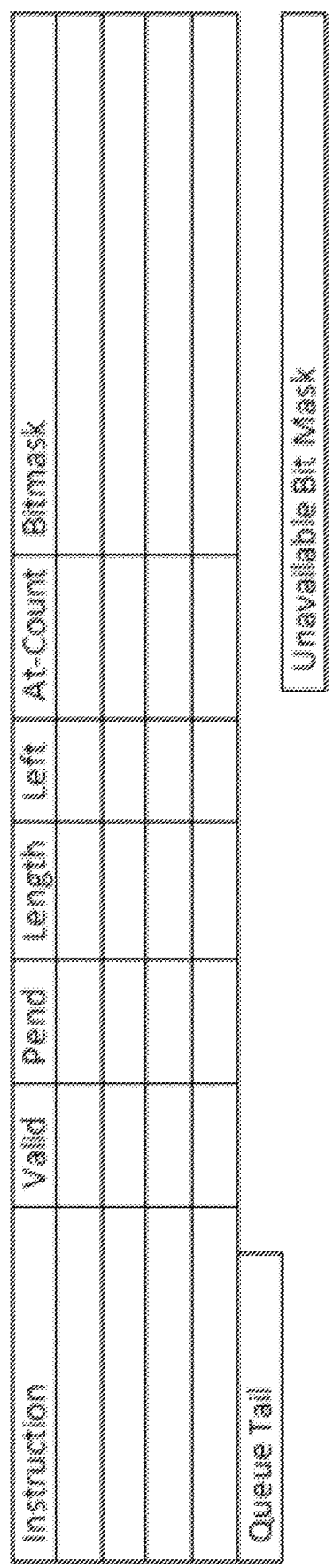
FIG. 8 is an instruction issue structure according to an example of the present disclosure.

The instruction issue structure as shown in FIG. 8 maintains a queue of slots for potential vector instructions, sorted in instruction fetch order. When an instruction is added to the issue structure, it is assigned the next available slot at the tail of the queue. The previous stages of the pipeline are set up to guarantee that there is always a slot available. If there is no slot available, instruction fetch may have stalled. When the instruction is added, the valid bit is set to 1, and the tail of the queue is incremented. The At-Count is set to 0.

Prior to an instruction being initially inserted into the instruction issue queue, it reads the vector length registers. If the value in that vector length register is not valid, the instruction is not considered to be ready for scheduling and is marked pending. Every time a value is written back to a vector length register, the register number is compared against the vector length register number in each instruction in the issue slot that has the Pending bit set. If they match, the value is copied into the slot for that register.

When the length becomes available, the left count is set up to the number of execution cycles required. This is generally the length/8. Thus, this is a count of the number of sub-vectors remaining for that instruction. When the left-count reaches zero, the instruction is removed from the queue, and the queue is compressed. At the time the values for that sub-vector are written to the register file, the instruction completion/retire logic is informed of the completion of that instruction.

When an instruction is inserted into the issue structure, a bit-mask corresponding to each of the sub-vectors is initialized. In our case, the bit-vector is 96 bits long. This bit-mask corresponds to the sub-vectors that need be available in order for the instruction to be issued against the first sub-vector. Generally, for an N-input instruction, it has N bits set, corresponding to the first sub-vector read for each input register. However, there may be some instructions that read some number of values larger than a sub-vector from one argument, and then repeatedly apply them against sub-vectors from the next argument. In that case, multiple bits corresponding to the sub-vectors for the first argument, and 1 bit for the first sub-vector for the second argument may be set.

The issue logic maintains a similar bit-mask of the unavailable sub-vectors. This works in co-operation with the rename logic and the register-file write-back logic. Every time a physical vector register is allocated to an instruction, all 8 of the sub-vectors corresponding to that vector register are marked as unavailable (i.e. set to 1). When an instruction writes back to a sub-vector, the corresponding bit is cleared.

Every cycle, the issue logic examines all instruction in the slots. For each slot, it checks if
- the slot is valid
- the vector length is not pending
- the vector count is not zero
- the bitwise- and of the sub-vector read bit-mask and the unavailable sub-vector bitmask is all zeroes It selects the oldest instruction (i.e. the one closest to the head) in the queue that satisfies these conditions for execution.

When an instruction is sent for execution, its count is decremented, and the sub-vector read-mask is adjusted. Generally, this involves shifting the some of the bits by 1.

When the vector count is 0, and the instruction is removed from the queue, the unavailable bits for its output vector register are all cleared. This takes care of the situation where the vector length is such that not all sub-vectors are written.

Vector Register Implementation

This section considers the issues relating to implementing a variable-length long vector-register architecture, such as the Unity instruction set architecture, specifically related to the register file. This section examines these issues in the context of various implementation styles. The styles considered range from straightforward in-order, non-renaming, non-pipelined implementations to more performance-oriented out-of-order, renaming, deeply pipelined implementations.

One defining characteristic of long-vector architectures is that the number of elements in a vector, and therefore the number of operations required to be performed on that vector, exceeds the number of available functional units that can perform those operations. In each cycle, only a subset of the vector operations can start being processed. Consequently, a vector instruction can, in general, require multiple cycles to complete.

Conventions

There are assumed to be 4 kinds of registers that are specific to the vector unit, including:
- Vector registers, written as $vN, which contains vectors of elements, such as bytes or floating-point single-precision numbers;
- Vector count registers, written as $nN, which contain the count of the number of elements that are to be operated on;
- Vector mask registers, written as $mN, which contain vectors of single bits, generally used as the output of vector compares, or to condition the element-wise behavior of vector instruction; and
- Vector accumulator registers, written as $cN, which contain are used to hold the scalar results of vector reduction operations such as dot-products, and are used in other situations where a scalar input/output is needed for vector operations.

The implementation of the register file both with and without renaming is examined. In a direct implementation, i.e. one without renaming, there is a one to one mapping between architected and physical registers. In a renamed implementation, the two are different. In the contexts where it is desirable to distinguish between an architected register and a physical register of the same type, lower and upper cases are used. Thus, in an implementation with renaming, if vector register number three is mapped to the physical register 11, we shall use $v3 and $V11, respectively.

Direct

In the absence of renaming, there is a 1-to-1 mapping between architected and physical registers. Thus, an instruction such as vaddf $n0,$v0,$v1,$v2 may read physical registers $V1 and $V2 and write physical register $V0. This section examines the issues that arise in handling exceptions in a direct implementation.

Imprecise Exceptions

Consider the case where the execution of one of the sequence of operations during the execution of a vector instruction can cause an exception, such as a divide-by-zero when dividing two elements while doing a vector floating-point divide, or an overflow/underflow when adding two elements during a vector floating point add.

One scenario is that no element of the vector output register can have been written before an exception is written. This is conceivably the case of a deeply-pipelined operation such as floating-point divide. If assuming a 20 stage floating-point divide pipeline which detects divide-by-zeroes in the first stage, 4 divide units, and a maximum of 64 element vector, then when the divide-by-zero exception of the last element in the vector is detected, the first element of the vector is still several stages away from completion, so the entire instruction can be aborted before the output register is modified.

The other, more likely, scenario is one where the exception occurs at a point where some of the outputs of the vector instruction have been written but not all. In that case, at the point where the exception occurs, the output register includes a mixture of new values, produced by the vector instruction and old values. This situation where the state of the processor at the point of an exception is intermediate between the execution of an instruction and its completion is known as an imprecise exception. Such an exception, including the methods for fixing up the exception and resuming, may be handled using any suitable method.

One corner case when dealing with precise exceptions arises when the same register is used both as an input and as an output, and there is a possibility that the input value is needed even after the output has been overwritten. Consider the Unity ISA instruction vmulmvf $n0,$v1,$v2,$v3. This instruction assumes that its second input, $v3, holds an N-by-N matrix and its first input $v2 holds multiple N-vectors. It repeatedly multiplies each of the N-vectors in $v2 with the N-by-N vector in $v3, and writes the results to $v1. Now, if the same register is used for both output and the matrix, as in vmulmvf $no,$v1,$v2,$v1, the matrix may be overwritten by the results.

One solution is to have an implementation that buffers the matrix in an internal register prior to beginning the computation, and have all matrix-vector multiplies use that internal buffer register for the matrix input. The issue with this solution is that if one of the intermediate computations takes an exception, at this point, the original value of $v1 has been (partially) overwritten. To be able to restart after fixing up the instruction, one would have to be able to recover the original matrix, conceivably by exposing the internal buffer register.

Another solution is to prohibit such instructions, either globally (so that no output register can ever be the same as an input), or in selected cases (so, allow the output of vmulmvf to be the same as the vector input, but not the matrix input).

In general, allowing imprecise exceptions has several undesirable consequences, including
- very complex exception recovery code
- addition of internal state to aid in recovery
- exposure of implementation specific internal state Precise Exceptions By contrast, on a processor with precise exceptions, at the point that the exception handler is entered after an exception caused by an instruction, the processor state appears as though the instruction had never been executed.

In the context of long vector instructions, one method for implementing precise exceptions is to have the instruction temporarily to write any results to an intermediate register until all elements have been processed, and then copy them to the output register. If an exception occurs in the middle, the copy is discarded, leaving the output register with its original contents.

Alternatively, one could copy the original contents of the output register to an internal register. If an exception occurs, the internal register is copied back to the internal register. If the execution succeeds, then the internal register contents can be discarded. The copying of the original contents of the output register to the internal register can be done in bulk prior to the execution of the instruction, or more lazily as the contents of the output register are overwritten. If the second approach is used, only the overwritten parts of the output register are copied back from the internal register if an exception occurs.

One advantage of imprecise exceptions in vector instructions arises in a situation where one wants to redo the vector instruction after handling the exception. With precise exceptions, it is necessary to start at the first element and redo any previously done work. With imprecise exceptions, after handling the exception, it is generally possible to start at the element that caused the exception, saving the need to redo all the previous work. This may potentially be a large savings.

Renaming

Renaming Vector Registers

Embodiments of the present disclosure may adapt the technique of register renaming to long vector registers. In register renaming, an architected register, i.e. the registers named in an instruction, are mapped to physical registers. There are more physical registers than architected registers. Before an instruction is executed, its input registers are mapped to physical registers, and its output registers are mapped to a new, unused, physical register. The physical registers may be recycled according to known techniques to provide free physical registers.

As an example, assume that the architected and physical registers have a 1-1 relationship, so that $v0 is mapped to $V0, $v1 to $V1 etc. Further, assume that there are 8 architected and 12 physical registers. FIG. 9 shows the mapping before and after executing a sequence of instructions. First, instruction vadd $n0,$v0,$v1,$v2 is executed, mapping architected register $v1 to physical register $V1 and $v2 to $V2, and allocating a new register to $v0, say $V8. So, the instruction that is executed is equivalent to vadd $n0,$V8,$V1,$V2 (ignoring any renaming for $n0). Next, the instruction vmul $n0,$v1,$v2,$v0 is executed. Now, $v2 is still mapped to $V2, but architected $v0 is actually physical $V8. A new register for $v1 is allocated, say $V9. The instruction that gets executed is vmul $n0, $V9,$V2,$V8. Finally, vsub $n0,$v0,$v1,$v0 is executed. $v0 and $v1 at this point are mapped to $V8 and $V9, and $v0 is now allocated a new register, say $V10, resulting in the effective instruction vsub $n0,$V10,$V9,$V8.

Exception Handling

Obviously, with renaming, obtaining precise exceptions is easy to accomplish. With renaming, the output register is an otherwise unused register that is physically different from the input register, even if it has the same architected register names. When an exception occurs while executing a vector instruction, the original state can be obtained by rolling back the mapping to its value before the exception occurred.

In current register allocation schemes, when an exception occurs, the new output register is freed because the results are no longer useful. However, in the case of vector registers, the partially completed results may be valuable, either in debugging, to help diagnose the cause of the exception, or to avoid having to re-compute these partial results after restart on an exception. In one embodiment, these partial results are preserved to expose them to the exception handling mechanism. This can be done in one of several ways:

Copy the contents of the output register to a different register, presumably a special-purpose non-renamed register, and then proceed to free the register as usual Prevent the register from being freed immediately, and provide a means for the exception handling code to access its contents. One way of doing this is to have another architected register name that the mapping logic may map to this register. There also exists a mechanism to free the register once the exception processing and recovery logic is done with its contents.

Name Reuse

In current register allocation schemes, every output register is allocated a new, unused, physical register. However, there are situations in which this is not desirable. For instance, consider the Unity ISA instruction vappendc $n0, $v1,$c2 that inserts the contents of $c2 into the vector register $v1 at position $n0 so that $v1 is both an input and an output. If the output physical register for $v1 is different than the input physical register, the elements of the input physical register (other than the one at $n0) are copied to the output physical register. This can be quite expensive. To modify one element in the vector, it is desirable to effectively copy the vector.

Embodiments of the present disclosure include a renaming mechanism that does not always create a new mapping for output registers, but instead preserves the mapping for some instructions. In the context of long-vector register implementations, this is useful for instructions where the output register is also an input register, and only a subset of the values of the input are modified.

Register Banks

Segmentation

The total memory required to implement a large-register-vector is going to be quite large. For example, if there are eight physical vector registers each with 256 bytes, the memory needed is 4K bytes. However, given that a vector instruction is to complete over multiple cycles, not all contents of a vector registers are needed at once.

In one embodiment, each register is split into segments so that a vector instruction typically processes at most a segment's worth of data at a time. For example, a 256-byte register can broken into 8 segments of 32 bytes each. A single-precision floating point add instruction vaddf_s $n0, $v0,$v1,$v2 can read the 8 single precision numbers in the first segment of $v1 and $v2, add them together, and write the results back to the first segment of $v0. Then the second segment and so on are similarly processed. If $n0 is smaller than the maximum value (64 in this case), it might not be necessary to read all segments. For instance if $n0 is 8, only the first segments of $v1 and $v2 need to be read and processed.

If the number of functional units matches the number required to process a complete segment, the processing may read the input's segments, and start the functional units. If the number of functional units is less than that number, multiple cycles may be needed to consume the entirety of the segments. The implementation can:

Reread the segment, choosing different subsets, until the entire segment has been processed, and/or Buffer the segment in an internal register, and read repeatedly from that internal register until it has been fully processed.

If the number of functional units exceeds the number required to process a complete segment and it is desired to keep them busy, the implementation may need to read and write multiple segments.

Another case where it is necessary to read/write multiple segments is in the case of those vector instructions which operate simultaneously on non-contiguous elements from the same register, where it is possible for the non-contiguous elements to come from different segments of the register. For instance, in the Unity ISA, the instruction vfftf_s_x8 $n0, $v1,$v2,$v3 specifies that the implementation perform a radix-2 FFT over 8 elements of $v2, where the elements are complex single precision floating point numbers. In this case, to perform the first FFT, the instruction may need to read the bytes [0 . . . 7] and bytes [64 . . . 71] simultaneously. Thus, to perform this operation, the instruction needs to read two 32 byte segments.

Memory Arrays

One way of implementing these register files is to use memory arrays. A memory array may include a number of rows, each containing a certain number of bits. When a row is addressed, the bits of that row can be read or written to. The number of bits in a row is called the width of the array.

A memory array can permit multiple rows to be read and/or written in the same cycle. An array that supports N simultaneous accesses in the same cycle is called an N-ported array. Some ports can be restricted to doing either a read or a write. For example, a so-called "dual ported array" can permit at most one row to be read and one row to be written in the same cycle. So, the "dual ported array" includes one read port and one write port. A "two port array," by contrast, has two ports that can be used for either a read or a write. Thus, a "two port array" can do two reads, or two writes, or a read and a write in the same cycle. As the number of ports increases while keeping the number of rows and width constant, the size of the array increases and the performance goes down.

There is a tradeoff between the width of a memory array and its power/performance. At a certain design point, for a specific number of rows, there is a maximum width that can be achieved. A number of smaller memory arrays may be grouped together and accessed in parallel to build what appears to be a wider memory array. For the purposes of discussion, it is assumed that it is possible to build arrays of a desired width desired either directly or by grouping smaller arrays.

Organization

In one embodiment, the register file is to use a memory array with one segment per row that is effectively one segment wide. Thus, with for a register file with 12 registers that have 4 segments of 32 bytes, we could implement it as a memory array with 48 rows of 256 bits (48×32 bytes).

An alternative implementation technique is to use multiple memory arrays. Thus, the example above could be implemented with 2 memory arrays, each containing 24 rows, or 3 memory arrays with 16 rows. Because each of these arrays contain fewer rows, the multiple memory array provides for the advantages of faster speed and lower power.

Read Ports

If the instruction-set architecture includes instructions that can read three segments and write 1 segment, such as vector multiply add vmuladd $n0,$v1,$v2,$v3, for full performance, the single array implementation may need a 3-read, 1-write port register file. An interesting peculiarity of this kind of vector instruction is that the instruction reads the same segments of all three registers. The instruction can first read the first segment of all three registers, then the second, etc. A multi-bank implementation where the ith segment of registers are distributed to different arrays so that no more than two registers have the same segment in the same array can cut the read port requirement down to two. This may require, at a minimum, that the number of arrays be half of the number of registers.

Embodiments of the present disclosure can organize the 48 segments as shown in FIG. 10. The notation $vN.I means the Ith segment of vector register N. Each column corresponds to a separate memory array, and each row to a row within that array. The number of rows is twice the number of segments.

As shown in FIG. 10, there are only 2 instances of each segment in any column. So, to read the inputs to a vmulred, at most 2 read ports is needed. This assumes that all the input registers are different. If the instruction specifies the same register twice (or three times), such as vmulred $n0,$v1, $v9,$v9,$v3, the hardware may recognize this case access only two registers (or one) and replicated it as needed.

Another case where the straightforward register file implementation may require the register file to need 3 read ports is when the instruction needs to access multiple segments of a register, as well as some other segment of another register (as in the vfft example above).

Again, multiple arrays may be used to reduce the read port requirement to two. As long as all the segments of a register are in different arrays, different segments of the register can be read in the same cycle without increasing the number of register ports. This requires that the number of banks be at least as large as the number of segments. Note that in the example above this condition is satisfied.

In the FFT case, the segments that are to be accessed simultaneously are a power of two apart. Assuming that there are eight segments and depending on the size of the FFT, the instruction may access segment I and segments I+1, I+2 or I+4 simultaneously. As long as there are at least three memory banks and the number of memory arrays is not a power of 2, it is possible to arrange the segments so that this power of two access pattern never requires two accesses to different rows of the same memory bank for the same register.

Write Ports

It may be possible to combine the write port(s) with the read ports, and decrease the overall number of ports in the memory arrays by implementing a register file in one of several ways.

In one embodiment, the register file is implemented by stalling instruction execution to all writes to occur so that when an instruction is about to write, it prevents any register reads by the current or any other instruction, and delays the read by a cycle.

A variation of this approach is when the memory arrays have 2 read ports and a single read/write port. In that case, the stall only occurs when attempting to issue a 3 input instruction at the same time as a write. In that case, the 3-input instruction is delayed. There is no impact on 2 input instructions.

Embodiments of the present disclosure may combine the stall approach with multiple banks. In this case, the memories may have 1 read port and 1 read/write port. If an instruction is attempting to read 2 rows from the same bank and at the same time, a value is being written to that bank, the instruction may get delayed by a cycle.

It is also possible to control write-port conflicts, on an implementation with register renaming, by having the register renaming logic examine the physical registers corresponding to the inputs, and then allocating a physical register that does not conflict with them.

For example of the 12 register in 4 segments, assume that the segment/bank layout is as in the example, and assume, for the purpose of this example, that all instructions take one cycle. For an instruction such as vmuladd, this means that segment 1 of the 3 inputs is being read at the same time as segment 0 of the output is being written. There can be at most one array whose ports are both being used for reads. If the output register is allocated such that its 0th segment is not in that port, there may be no collision. Assume that the instruction is vmulred $n0,$v7,$v0,$v1,$v3 and that $v0, $v1,$v3 are mapped to $V0,$V1 and $V3. $V0 and $V3 read from the memory array every cycle. In the second cycle, they read from bank 1. As long as the register rename logic does not map $v0 to $V6 or $V9, there is no collision between the writes and the reads.

Properties

Type

An architecture may specify that behavior of an instruction as undefined if the type of the elements last written to a register does not match the type that is expected by the instruction.

One option is to ignore this situation, and interpret the contents of the register as though they were elements of the expected type. This option can result in less expensive hardware, but makes it harder to detect certain kinds of bugs in programs.

Another option is to detect this mismatch and take action, preferably by raising an exception. In this case, the type information is stored with each register. For the purposes of context switching, this information may be accessible by the code that saves and restores register state, so that it can also save and restore the type information.

Length

An architecture may define that behavior of an instruction to be undefined if the number of elements that was last written to a register is less than the number that is to be read by the instruction.

One option is to detect this mismatch, and take corrective action, preferably by raising an exception. In this case, the length information is stored with each register. For the purposes of context switching, this information may be accessible by the code that saves and restores register state, so it can also save and restore the length information.

An alternative approach is to ignore the length mismatch, and use the contents of the register. In particular, the value of the elements beyond those written by the last instruction to write the register may depend on the values written by previous instructions to write the register. These may not be predictable in the situation where these values were written by instructions other than the current program, leading to unacceptably variable results.

Another alternative approach to have an instruction to overwrite the entire register every time the register is written, setting the elements that would not otherwise be written by an instruction to a default value. This default value can be a NaN or some other predefined value, or it can be the contents of a configuration register.

Alternatively, a length is stored with each register (as described above), using the stored length to detect attempts to read beyond the elements written. At this point, the value returned could be the default value.

A hybrid approach is to break a vector register into a certain number of sections, and keep track of the number of sections written by an instruction, preferably using a bit-mask. When a vector instruction writes to a vector register, the number of sections written is recorded. If the last section is only partially written, then the trailing elements of that section are set to the default value.

Note that in this approach, the context switch code does not need to save any length registers. The context switch code, when reading the register, may attempt to read the entire register. This includes the elements last written to this register, and possibly some trailing elements containing default values. Then, when the vector register is restored, all of it can be overwritten, but the same set of trailing elements can contain default values.

Variations

Although exemplary instructions with at most 3 inputs and 1 output are discussed in this disclosure, the same techniques can be applied, without limitation, to instructions with more inputs and outputs. Similarly, although the disclosure describes to cut the port requirement down from 3 read+1 write port to 1 read+1 read/write port in a vector register file by multi-banking, similar techniques can be used to achieve savings in other contexts.

Implementation

The implementation is based on a design target that includes the need to overlap execution between separate vector instructions and a small degree of out-of-order, supporting precise exceptions and minimizing the implementation cost.

One embodiment may include the implementation of a renamed register file that names 8 architected registers to 12 physical registers. The physical registers are 256 bytes long, divided into 8 sub-vectors of 32 byte each. The registers are implemented using 6 memory banks, built out of smaller arrays so that they are effectively of size 16×512 bytes.

In one embodiment, the type or length tags are not kept on each register. But, returning a default value for undefined parts of the register file is supported.

Figure 11:
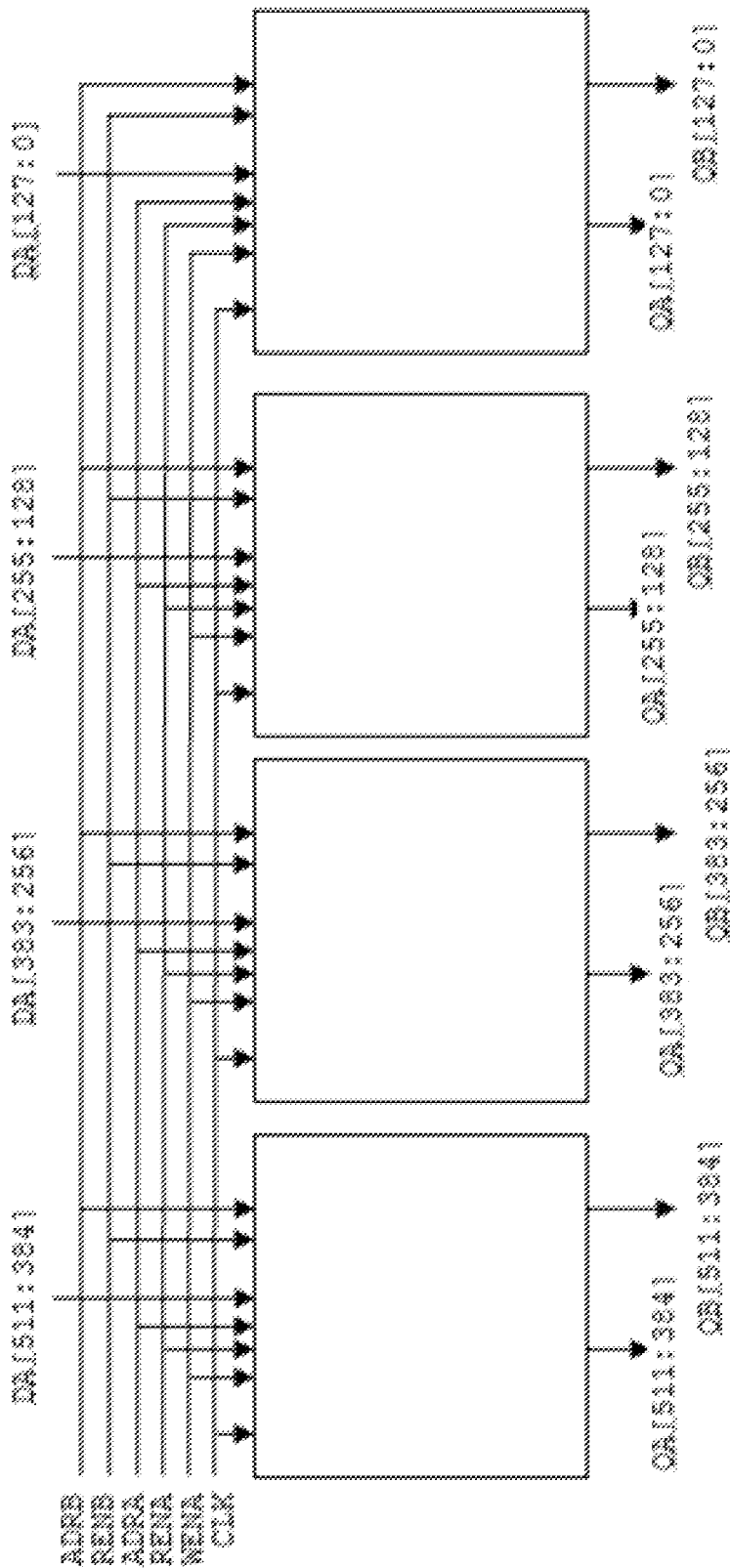
FIG. 11 is a memory bank according to an example of the present disclosure.

The memory banks are built using four 16×128b arrays, with various control connected in common, and separate data signals. This is shown in FIG. 11. Each of these banks includes a read/write port A and a read-only port B. The read-enable for port A (RENA), write-enable for port A (WENA), the row address for port A (ADRA), the read-enable for port B (RENB), write-enable for port A (WENB), the row address for port B (ADRB), and the clock (CLK) are common to all memory arrays. The write data input for port A (DA) and the two read data outputs for ports A & B (QA,QB) are distributed across all the memories arrays, as shown in FIG. 11.

Figure 12:
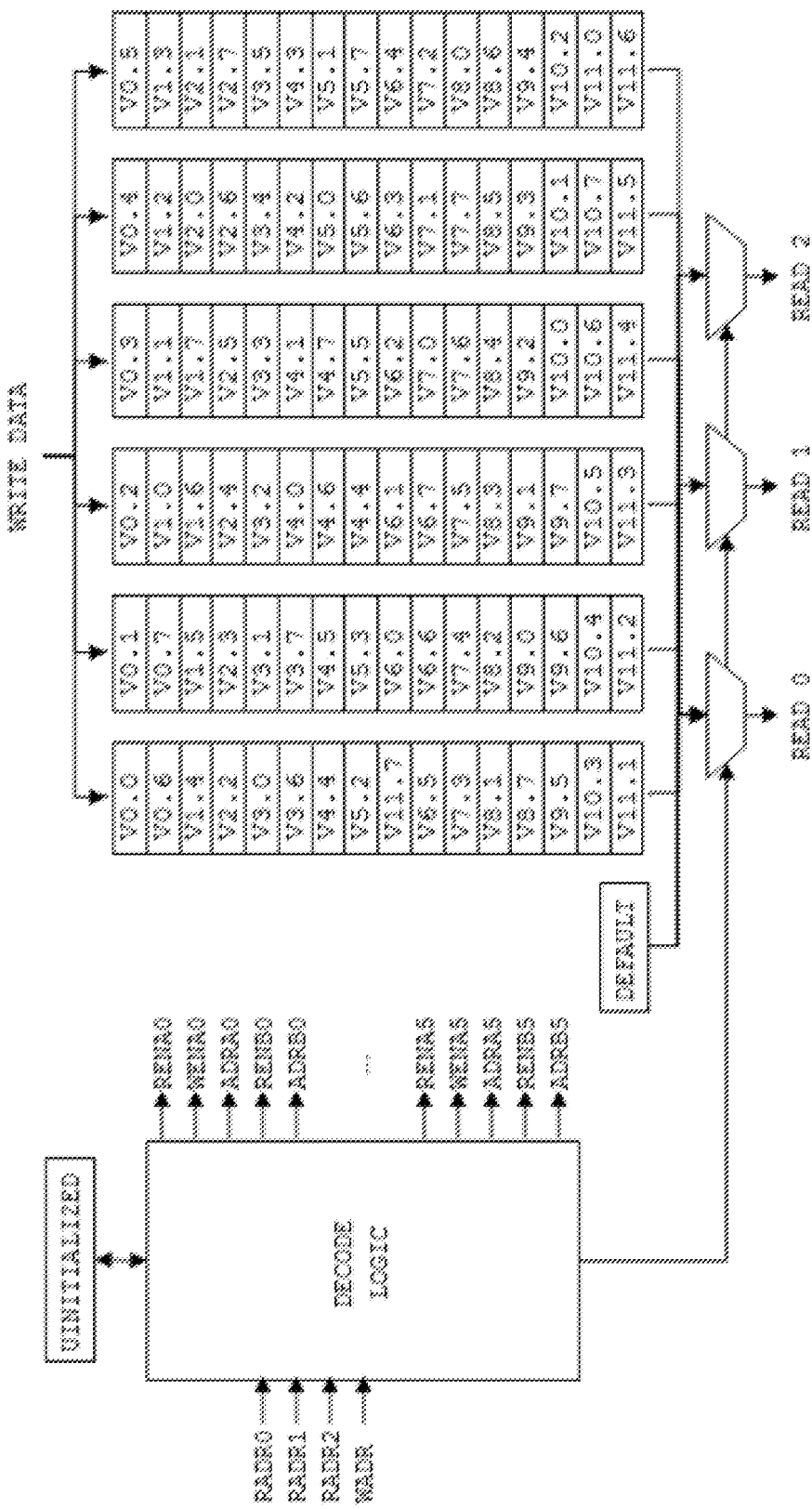
FIG. 12 is vector register file according to an example of the present disclosure.

Six memory banks formed from these arrays are combined as shown in FIG. 12. The decode logic can receive up to 3 reads and 1 write requests for subvectors every cycle, resulting in different subvectors being enabled for reading and writing. The decode logic may convert these requests into the read and write enables as well as addresses for the 2 ports on each of the 6 banks. Thus, up to 4 banks can be activated in a cycle. Each of the 3 outputs is connected using a 512 byte wide 7-to-1 mux to the 6 banks plus to the default value as described below.

The logic for mapping subvector N in register R is:

```
if( R < 6 )
    bank = (R*8+N)%6
    addr = (R*8+N)/6
else
    bank = (R*8+N+1)%6
    addr = (R*8+N)/6 + 8
```

In addition, embodiments provide for a default value for undefined subvectors. There is an array of 96 bits used to indicate if the corresponding sub-vector has valid contents. It is implemented using flops that are set to 1 if the corresponding sub-vector was last written during an operation. It is cleared on chip reset, and when the register is first allocated during renaming. When a sub-vector is written, its bit is set. When a sub-vector is read, and its bit is 0, the value provided is read from the default value register. This is a 64 bit register, whose contents can be replicated to 512 bits.

Implementation Variations

Implementations can differ from each other in the fine-grain micro choices of the exact pipeline organization and the technology picked, etc. However, this section examines coarser variations in the nature of the implementation as described above section including possible implementation variations such as:
- different vector register sizes,
- different vector registers for different types, possibly with different number of elements,
- different mixtures of functional units,
- different unimplemented vector instructions (e.g. instructions that are implemented entirely in software),
- partial implementation (e.g. some instruction variants are implemented in hardware, but others cause interrupts and are implemented in software).

Vector-Unit Less Implementation

One possibility for an extremely low cost implementation is one that omits the vector unit, causing an interrupt to be taken every time a vector instruction is selected for execution. In this case, the vector-unit is implemented exclusively in software, and all vector instructions are executed via emulation.

Multi-Threaded Implementation

There are many styles of multi-threaded implementation, including round-robin, hyper-threading, symmetric multi-threading, etc. In the context of the vector unit, the techniques of multi-threading apply:
- There is a copy of the architected register file for each of the threads that are supported by the processor;
- In an in-order multi-threaded processor, there is a separate register file for each thread;
- In multi-threaded processor with renaming, each thread may have its own pool of registers for renaming, or there may be a common pool and registers are renamed from that pool;
- All threads share using the same functional units for executing their vector instructions.

Asymmetric Multi-Threading

Embodiments of the present disclosure include asymmetric multi-threading this is a version of multi-threading in which not all threads have equal access to resources in the processor. In the specific context of an implementation with a vector processor, this would mean that only some threads would have access to the vector unit.

In a vector unit, a considerable area is consumed by the vector register file. In a multi-threaded implementation, each additional thread increases the number of required registers, causing the area of the register file to grow. Larger area increases costs and can impact cycle time.

Further, not all threads require the vector unit. For example, in the case where there is a 2-way multi-threaded processor in which one thread handles I/O interrupts, and the other thread is performing number crunching, the interrupt handling thread does not need any vector processing. In this case, it is fine with only one thread having accessing to the vector unit. Consequently, if the embodiment includes a multi-threaded processor in which some threads have access to the vector unit, and others do not, it only needs to implement enough vector register states to satisfy the requirements of the threads that do have access, thereby saving on the register area. For instance, if there are a 3-threaded processor where only 1 thread was allowed access to the vector unit, the implementation only needs to have vector registers for only 1 thread as opposed to 3, resulting in a large savings. If it turned out that only one program at a time needed to use the vector unit, this saving comes with no loss in performance.

Static Vs. Dynamic Asymmetric Multi-Threading

In the case of static multi-threading, certain hardware threads have access to the vector unit, and others do not. The allocation of hardware threads is fixed by the hardware. If a program running on a thread with no access to the vector unit wants to start executing vector instructions, it is swapped out of the processor, and then swapped back in onto a thread that does have vector access.

In the case of dynamic multi-threading, the processor can be configured to allow different threads to the vector unit so that at any one time only a subset of all threads have access to the vector unit, but that subset can be changed. In this particular case, if a program running on a thread with no access to the vector unit wants to start executing vector instructions, the hardware can be reconfigured to allow that thread access to the vector unit.

In the case of dynamic multi-threading, the program can be assigned to access to the vector unit directly if no other program is using a vector unit, or it can be made to wait till a vector unit becomes available when a program that is using the vector unit releases it, or some other thread can be forced to release its vector unit.

Generally, when a program releases a vector unit, this is similar to being swapped out during a context switch. The vector registers being used by the program are saved, generally by the operating system, in an area that is specific to that program. When a program acquires a vector unit, this is similar to being swapped in during a context switch. The vector registers are loaded, generally by the operating system, from an area specific to that program.

Generalization

This section describes asymmetric multi-threading as applied to the vector unit, in which only a subset of threads are allowed simultaneous access to the vector unit, thereby allowing the implementation to only hold the vector state for those threads, as opposed to holding the vector state for all threads. Given the size of the vector registers and the area of the vector register files, this results in a substantial savings.

However, this idea has more general applicability. For example, in any multi-threaded processor, it is possible to allow threads to have asymmetric access to processor resources, and thereby save the cost of having all threads be able to access all resources. For example, in a multi-threaded implementation for an embedded processor, it may make sense to do the same for the floating point unit—say, have 4 threads, but only one with access to the floating point unit, and therefore only have one set of floating point registers.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A processor, comprising:
    a vector register file comprising vector registers to hold complex elements, wherein each one of the complex elements is a data item comprising a real part and an imaginary part, and each one of the real part and the imaginary part is represented by one or more bits;
    a length register file comprising a length register to store an integer value L representing a number of operations; and
    a processing logic to implement a variable length vector instruction comprising one or more complex arithmetic instructions, the variable length vector instruction comprising:
        a first field comprising identifiers of one or more vector registers in the vector register file holding a varying number of complex elements; and
        a second field comprising an identifier of the length register to store the integer value L representing the number of operations applied to the varying number of complex elements held in the one or more vector registers, wherein the number of operations is independent from a number of complex elements packed in the one or more vector registers, and wherein the number of operations stored in the length register is larger than a number of complex elements that each of the one or more vector registers is able to hold in a hardware implementation.

2. The processor of claim 1, wherein the number of operations is one of different than or same as the number of complex elements held in the one or more vector register, and wherein the processor is implemented as a monolithic integrated circuit.

3. The processor of claim 1, wherein the length register file comprises a second length register to specify a number of complex elements packed in the one or more vector registers.

4. The processor of claim 1, wherein the varying number of complex elements are stored in the one or more vector registers as a sequence of alternating real parts and imaginary parts, wherein a pair of a real part and an imaginary part constitute a complex element.

5. The processor of claim 1, wherein the processing logic is further to read a first vector and a second vector from the one or more vector registers, treat contents of the first vector and the second vector as vectors of complex elements, element-wise multiply the complex elements from the first vector register with the second vector register to produce a resulting vector of complex elements, and store the resulting vector of complex elements to the vector register file.

6. The processor of claim 1, wherein the processing logic is further to read three vectors from the one or more vector registers, treat contents of the three vectors as vectors of complex elements, element-wise multiply the complex elements from a first vector register with a second vector register to produce a product, add the product to a third vector to produce a third vector of complex vectors, and store the third vector to the vector register file.

7. The processor of claim 1, wherein the processing logic is further to read a first vector and a second vector from the one or more vector registers, treat contents of the first vector and the second vector as vectors of complex elements, element-wise multiply the complex elements from the first vector register with the second vector register, and sum together the resulting products to produce a single complex number.

8. The processor of claim 7, further comprising an accumulator register file comprising one or more accumulator registers to store the single complex number.

9. The processor of claim 7, further comprising a floating point register file comprising two or more floating point registers, wherein the single complex number is stored to two floating point registers of the two or more floating point registers.

10. The processor of claim 7, further comprising a general purpose register file comprising two or more general purpose registers to store the single complex number.

11. The processor of claim 1, wherein the processing logic is further to read two vectors from the one or more vector registers, treat contents of the two vector registers as vectors of complex elements, element-wise multiply the complex elements from a first vector register with a second vector register to produce resulting products, and sum the resulting products with an input single complex number to produce a single complex number.

12. The processor of claim 11, further comprising an accumulator register file comprising one or more accumulator registers, wherein the input single complex number is read from an accumulator register of the one or more accumulator registers, and wherein the single complex number is stored to the accumulator register file.

13. The processor of claim 11, further comprising a floating point register file comprising two or more floating point registers, wherein the input complex number is read from two floating registers of the two or more floating point registers, and wherein the single complex number is stored to the two floating point registers of the two or more floating point registers.

14. The processor of claim 11, further comprising a general purpose register file comprising two or more general purpose registers, wherein the single complex number is read from the two general purpose registers of the two or more general purpose registers, and wherein the single complex number is stored to the two general purpose registers of the two or more general purpose registers.

15. The processor of claim 1, wherein the processing logic is further to read two vectors from the one or more vector registers, treat contents of the two vectors as vectors of complex elements, element-wise multiply the complex numbers from a first vector register with a second vector register, split the resulting products into groups, sum the complex elements of products of each group to produce a vector of complex elements, and store the vector of complex elements to the vector register file.

16. The processor of claim 1, wherein the processing logic is further to read a vector from the one or more vector registers, treat contents of the one or more vector as the complex elements, and sum the complex elements to produce a single complex number.

17. The processor of claim 1, wherein the processing logic is further to read a vector from the one or more vector registers, treat contents of the vector as the complex elements, and sum together the complex elements with a single input complex number to produce a single complex number.

18. The processor of claim 17, further comprising an accumulator register file comprising one or more accumulator registers, wherein the single complex number is read from an accumulator register of the one or more accumulator registers, and wherein the single complex number is stored to the accumulator register file.

19. The processor of claim 17, further comprising a floating point register file comprising two or more floating point registers, wherein the single complex number is read from two floating registers of the two or more floating point registers, and wherein the single complex number is stored to the two floating point registers of the two or more floating point registers.

20. The processor of claim 17, further comprising a general purpose register file comprising two or more general purpose registers, wherein the single complex number is read from two general purpose registers of the two or more general purpose registers, and wherein the single complex number is stored to the two general purpose registers of the two or more general purpose registers.

21. The processor of claim 1, wherein the processing logic is further to read a vector from the one or more vector registers, treat contents of the vector as the complex elements, divide the vector elements into groups, and sum together the complex elements in each group to produce a corresponding vector of complex number, and store the vector of complex elements to the vector register file.

22. A method comprising:
    storing, by a processing logic of a processor, in vector registers in a vector register file, complex elements, wherein each one of the complex elements is a data item comprising a real part and an imaginary part, and wherein each one of the real part and the imaginary part is represented by one or more bits;
    storing, by the processing logic, an integer value L representing a number of operations in a length register of a length register file; and
    executing, by the processing logic, a variable length vector instruction comprising one or more complex arithmetic instructions, the variable length vector instruction comprising:
        a first field comprising identifiers of one or more vector registers in the vector register file holding a varying number of complex elements; and
        a second field comprising an identifier of the length register store the integer value L representing the number of operations applied to the varying number of complex elements held in the one or more vector registers, wherein the number of operations is independent from a number of complex elements packed in the one or more vector registers, and wherein the number of operations stored in the length register is larger than a number of complex elements that each of the one or more vector registers is able to hold in a hardware implementation.

23. The method of claim 22, wherein the number of operations is one of different than or same as the number of complex elements held in the one or more vector register, and wherein the processor is implemented as a monolithic integrated circuit.

24. The method of claim 22, wherein the length register file comprises a second length register to specify a number of complex elements packed in the one or more vector registers.

25. The method of claim 24, wherein the varying number of complex elements are stored in the one or more vector registers as a sequence of alternating real parts and imaginary parts, wherein a pair of a real part and an imaginary part constitute a complex element.

26. The method of claim 22, further comprising reading, by the processing logic, a first vector and a second vector from the one or more vector registers, treating contents of the first vector and the second vector as vectors of complex elements, element-wise multiplying the complex elements from the first vector register with the second vector register to produce a resulting vector of complex elements, and storing the resulting vector of complex elements to the vector register file.

27. The method of claim 22, further comprising reading, by the processing logic, three vectors from the one or more vector registers, treating contents of the three vector registers as vectors of complex elements, element-wise multiplying the complex elements from a first vector register with a second vector register to produce a product, adding the product to the third vector to produce a third vector of complex vectors, and storing the third vector to the vector register file.

28. The method of claim 22, further comprising reading, by the processing logic, a first vector and a second vector from the one more vector registers, treating contents of the first vector and the second vector as vectors of complex elements, element-wise multiplying the complex elements from the first vector register with the second vector register, and summing together the resulting products to produce a single complex number.

29. The method of claim 28, wherein the processor further comprises an accumulator register file comprising one or more accumulator registers, and further comprising storing the single complex number to the accumulator register file.

30. The method of claim 28, wherein the processor further comprises a floating point register file comprising two or more floating point registers, and further comprising storing the single complex number to the two floating point registers of the two or more floating point registers.

31. The method of claim 28, wherein the processor further comprises a general purpose register file comprising two or more general purpose registers, and further comprising storing the single complex number to the two general purpose registers of the two or more general purpose registers.

32. The method of claim 22, further comprising reading, by the processing logic, two vectors from the one or more vector registers, treating contents of the two vector registers as vectors of complex elements, element-wise multiplying the complex elements from a first vector register with a second vector register to produce resulting products, and summing the resulting products with an input single complex number to produce a single complex number.

33. The method of claim 32, further comprising an accumulator register file comprising one or more accumulator registers, and further comprising reading the input single complex number from an accumulator register of the one or more accumulator registers, and storing the single complex number to the accumulator register file.

34. The method of claim 32, wherein the floating point register file comprises two or more floating point registers, and further comprising reading the input complex number from two floating registers of the two or more floating point registers, and storing the single complex number to the two floating point registers of the two or more floating point registers.

35. The method of claim 32, wherein the processor further comprises a general purpose register file comprising two or more general purpose registers, and further comprising reading the single complex number from two general purpose registers of the two or more general purpose registers, and storing the single complex number to the two general purpose registers of the two or more general purpose registers.

36. The method of claim 22, further comprising reading, by the processing logic, two vectors from the one or more vector registers, treating contents of the two vectors as vectors of complex elements, element-wise multiplying the complex numbers from a first vector register with a second vector register, splitting the resulting products into groups, summing the complex elements of products of each group to produce a vector of complex elements numbers, and storing the vector of complex elements to the vector register file.

37. The method of claim 22, further comprising reading, by the processing logic, a vector from the one or more vector registers, treating the contents of the vector as the complex elements, and summing the complex elements to produce a single complex number.

38. The method of claim 22, further comprising reading, by the processing logic, a vector from the one or more vector registers, treating contents of the vector as the complex elements, and summing the complex elements with a single input complex number to produce a single complex number.

39. The method of claim 38, wherein the processor further comprises an accumulator register file comprising one or more accumulator registers, and further comprising reading the single complex number from an accumulator register of the one or more accumulator registers, and storing the single complex number to the accumulator register file.

40. The method of claim 38, wherein the floating point register file comprises two or more floating point registers, and further comprising reading the single complex number from two floating registers of the two or more floating point registers, and storing the single complex number to the two floating point registers of the two or more floating point registers.

41. The method of claim 38, wherein the processor comprises a general purpose register file comprising two or more general purpose registers, and further comprising reading the single complex number from two general purpose registers of the two or more general purpose registers, and storing the single complex number to the two general purpose registers of the two or more general purpose registers.

42. The method of claim 22, further comprising reading, by the processing logic, a vector from the one or more vector registers, treating contents of the vector as the complex elements, dividing the vector numbers into groups, summing the complex numbers in each group to produce a corresponding vector of complex number, and storing the vector of complex numbers to the vector register file.

* * * * *